US010721099B2

(12) United States Patent
Kubo et al.

(10) Patent No.: US 10,721,099 B2
(45) Date of Patent: Jul. 21, 2020

(54) RADIO COMMUNICATION SYSTEM AND BASE STATION

(71) Applicant: NTT DOCOMO, INC., Tokyo (JP)

(72) Inventors: Takahiro Kubo, Tokyo (JP); Takahiro Asai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/083,008

(22) PCT Filed: Mar. 8, 2017

(86) PCT No.: PCT/JP2017/009301
§ 371 (c)(1),
(2) Date: Sep. 7, 2018

(87) PCT Pub. No.: WO2017/154994
PCT Pub. Date: Sep. 14, 2017

(65) Prior Publication Data
US 2019/0116064 A1    Apr. 18, 2019

(30) Foreign Application Priority Data
Mar. 11, 2016  (JP) .................................. 2016-048749

(51) Int. Cl.
H04L 25/02  (2006.01)
H04W 24/02  (2009.01)
(Continued)

(52) U.S. Cl.
CPC ....... *H04L 25/0202* (2013.01); *H04B 7/0413* (2013.01); *H04L 43/0847* (2013.01);
(Continued)

(58) Field of Classification Search
CPC ...... H04B 7/02; H04B 7/0413; H04B 7/0452; H04B 7/066; H04B 7/26; H04B 7/2606;
(Continued)

(56) References Cited

U.S. PATENT DOCUMENTS 8,756,477 B2 * 6/2014 Challa ............... H03M 13/6525
714/758
9,538,410 B2 * 1/2017 Park .................... H04B 7/2643
(Continued)

FOREIGN PATENT DOCUMENTS

| EP | 2753143 A1 | 7/2014 |
| EP | 2785139 A1 | 10/2014 |
| JP | 2016-116149 A | 6/2016 |

OTHER PUBLICATIONS

Uwe Dotsch, "Quantitative Analysis of Split Base Station Processing and Determination of Advantageous Architectures for LTE," Bell Labs Technical Journal, vol. 18, Issue 1; IEEE Xplore Digital Library, Jun. 2013, p. 105-128 (26 pages).
(Continued)

*Primary Examiner* — Young T Tse
(74) *Attorney, Agent, or Firm* — Osha Liang LLP

(57) ABSTRACT

There is provided a radio communication system provided with a first base station, a second base station that communicates with the first base station, and user equipment that communicates with the first base station, the radio communication system including a determiner that determines, based on a predetermined reference value, sharing between signal processing that is to be performed by the first base station and signal processing that is to be performed by the second base station; a first signal processor for the first base station to perform the signal processing in accordance with the sharing determined by the determiner; and a second signal processor for the second base station to perform the signal processing in accordance with the sharing determined by the determiner.

3 Claims, 15 Drawing Sheets

(51) Int. Cl.
*H04B 7/0413* (2017.01)
*H04L 12/26* (2006.01)
*H04W 88/08* (2009.01)
*H04W 28/02* (2009.01)

(52) U.S. Cl.
CPC ........ *H04W 24/02* (2013.01); *H04W 28/0205* (2013.01); *H04W 88/085* (2013.01)

(58) Field of Classification Search
CPC . H04L 25/0202; H04L 25/024; H04L 25/025; H04L 25/0256; H04L 43/0847; H04W 24/02; H04W 28/0205; H04W 88/085
USPC ........ 375/225, 227, 259, 260, 267; 370/208, 370/310.2, 328, 333–335, 342; 455/456.5, 456.6, 500, 501, 517, 524, 455/63.1, 67.13, 88

See application file for complete search history.

(56) References Cited

U.S. PATENT DOCUMENTS

| | | | | |
|---|---|---|---|---|
| 2010/0322227 | A1* | 12/2010 | Luo | H04B 7/024 370/345 |
| 2011/0129009 | A1* | 6/2011 | Doan | H04L 25/0232 375/227 |
| 2012/0094702 | A1* | 4/2012 | Furueda | H04W 72/02 455/501 |
| 2015/0098440 | A1* | 4/2015 | Yang | H04J 11/0056 370/330 |
| 2015/0126236 | A1* | 5/2015 | Mukherjee | H04B 7/0417 455/522 |
| 2016/0066284 | A1* | 3/2016 | Kwon | H04W 52/365 370/329 |
| 2016/0142973 | A1* | 5/2016 | Lee | H04W 36/165 370/311 |
| 2016/0182281 | A1 | 6/2016 | Kobayashi | |

OTHER PUBLICATIONS

NTT DOCOMO, Inc., "DOCOMO 5G white paper," Sep. 2014, Internet: URL: https://www.nttdocomo.co.jp/corporate/technology/whitepaper_5g/ (27 pages).

International Search Report issued in International Application No. PCT/JP2017/009301, dated May 16, 2017 (2 pages).

Written Opinion issued in International Application No. PCT/JP2017/009301, dated May 16, 2017 (6 pages).

Extended European Search Report issued in the counterpart European Patent Application No. 17763334.4, dated Nov. 19, 2018 (11 pages).

Shibata et al.; "System Level Performance of Uplink Transmission in Split-PHY processing architecture with Joint Reception for Future Radio Access"; IEEE 26th International Symposium on Personal, Indoor and Mobile Radio Communications; Aug. 30, 2015, pp. 1375-1379 (5 pages).

Notice of Reasons for Refusal issued in counterpart Japanese Patent Application No. 2016-048749, dated Oct. 29, 2019 (10 pages).

Office Action issued in the counterpart European Patent Application No. 17763334.4, dated May 10, 2019 (6 pages).

Office Action issued in the counterpart Japanese Patent Application No. 2016-048749, dated Aug. 6, 2019 (9 pages).

Office Action issued in the counterpart European Patent Application No. 17763334.4, dated Feb. 19, 2020 (6 pages).

* cited by examiner

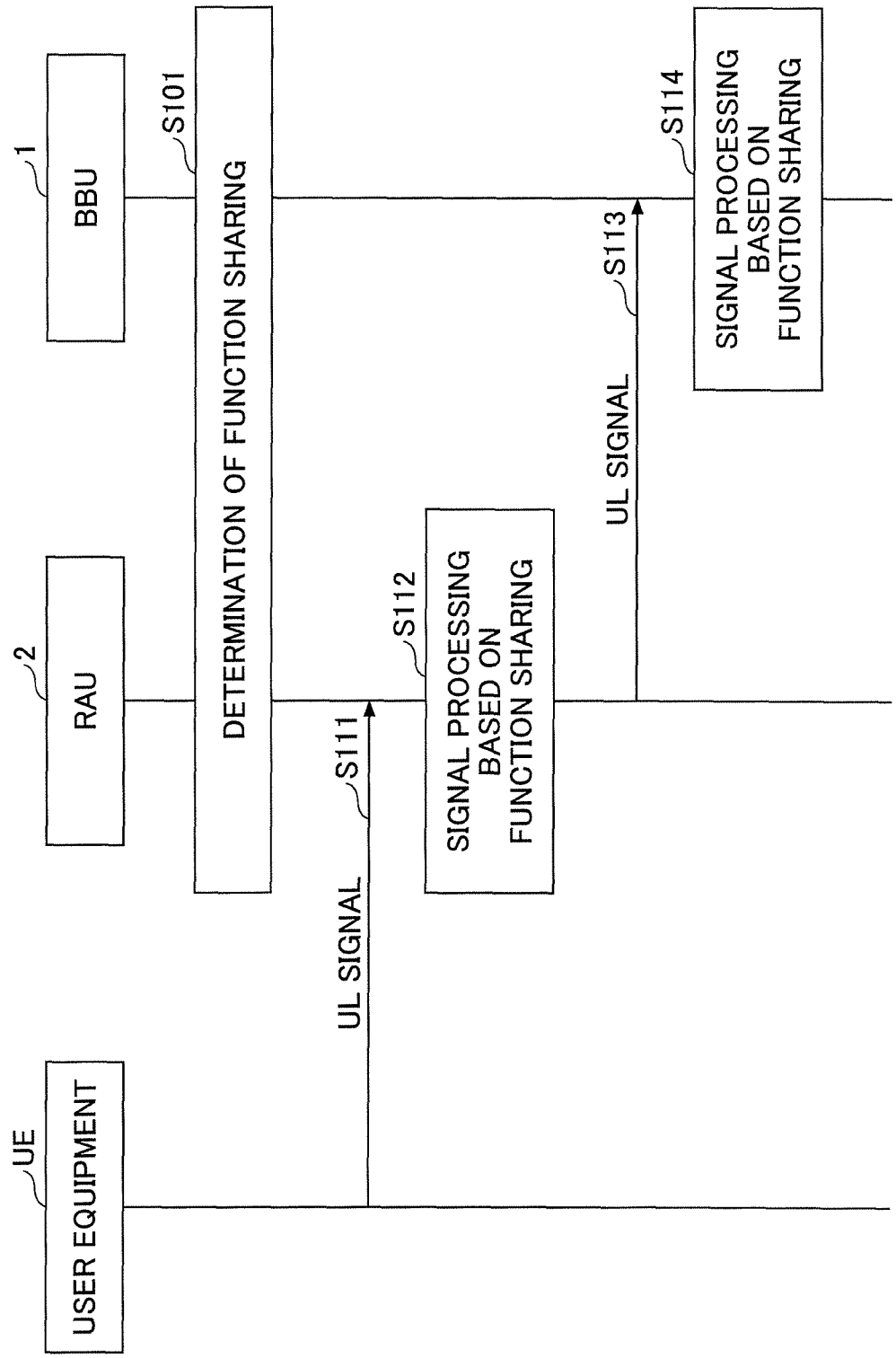

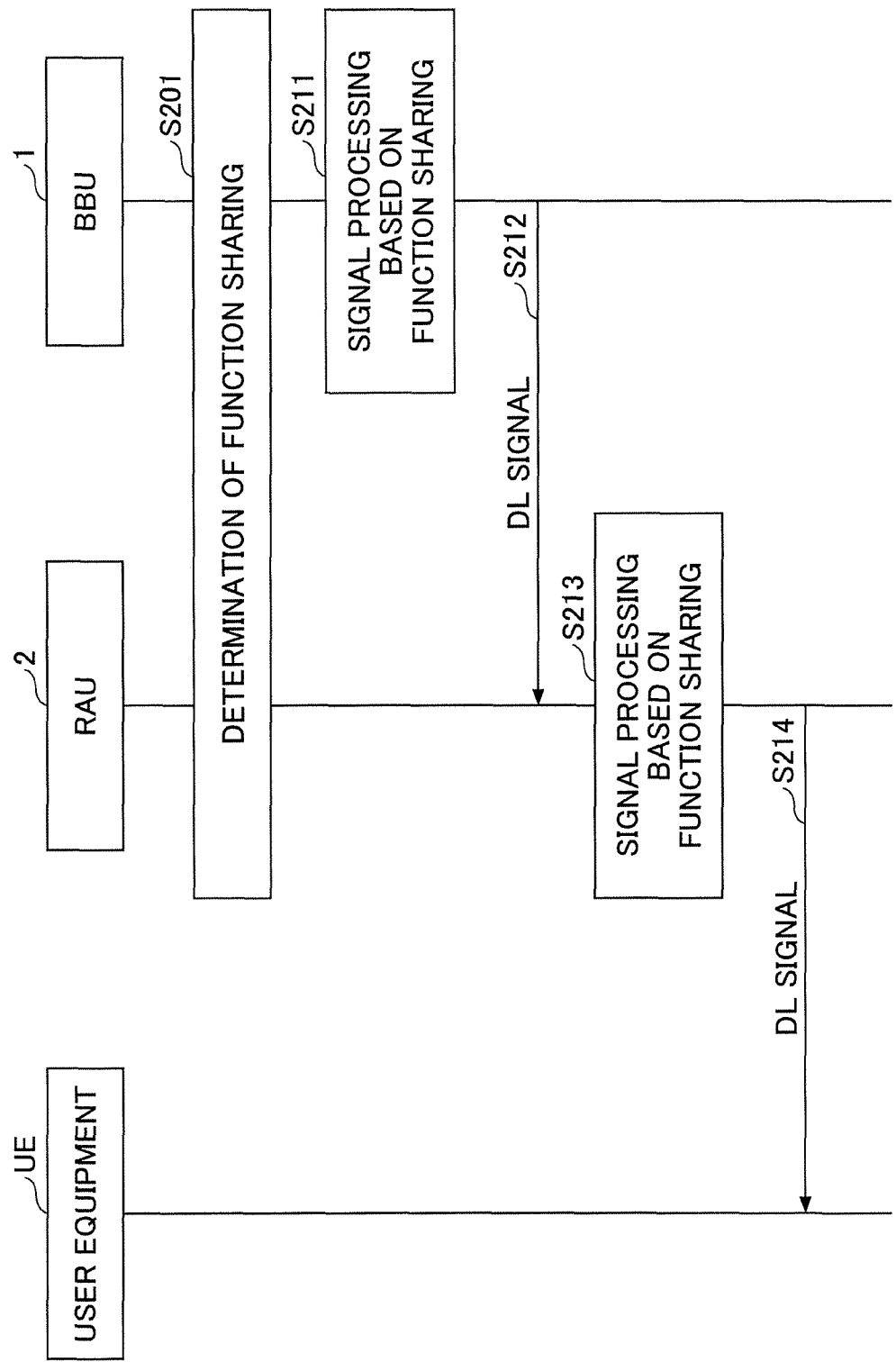

RADIO COMMUNICATION SYSTEM AND BASE STATION

TECHNICAL FIELD

The present invention relates to a radio communication system and a base station.

BACKGROUND ART

In a radio communication system of Long Term Evolution (LTE) and LTE-Advanced (LTE-A), a technology has been known, which is called a centralized radio access network (C-RAN) and which is capable of accommodating a plurality of cells while suppressing a device cost so as to efficiently support an area such as a high-traffic hot spot.

The C-RAN is formed of one or a plurality of remote antenna units (RAU) which are remote installation type base stations (slave station), and a baseband unit (BBU) that is a base station (master station) that concentrically controls the RAU. The BBU has functions of Layer 1 to Layer 3 which are included in the base station. A digital baseband signal, which is generated in the BBU, is transmitted to the RAU, and is transmitted from a radio frequency (RF) function unit included in the RAU.

A network line that connects the BBU and the RAU is called a front haul (FH), and a common public radio interface (CPRI) is used as the FH in the LTE.

PRIOR ART DOCUMENT

Non-Patent Document 1: Non-Patent Document 1: "DOCOMO 5G white paper", September, 2014, NTT DOCOMO, Internet URL: https://www.nttdocomo.co.jp/corporate/technology/whitepaper_5g/

SUMMARY OF THE INVENTION

Problem to be Solved by the Invention

In the current LTE, the functions of Layer 1 (physical layer: L1), Layer 2 (MAC, RLC, PDCP), and layers higher than Layer 2 are implemented in a BBU side. Accordingly, when 2×2 multi input multi output (MIMO) is used, a band required for the FH is approximately 16 times a peak rate that is supported in the BBU. For example, as illustrated in FIG. 1, when a system band is 20 MHz, and the BBU supports a radio communication (maximum: 150 Mbps) of 2×2 MIMO, a band required for the CPRI is approximately 2.5 Gbps. In addition, in this configuration, the band required for the CPRI increments in proportional to an increase in the number of antennas and an increase in the system band.

In addition, when 5G, which has currently been studied, is introduced, the band necessary for the FH significantly increases in accordance with enhancement of a peak rate. For achieving a peak rate of 10 Gbps, the band required for the CPRI is greater than or equal to several hundreds of Gbps, which is not supported by the current CPRI standard (maximum: 24.33 Gbps).

Here, it has been studied to reduce a transmission amount through the FH by implementing a part of the layers implemented in the BBU in an RAU side. Various variations have been studied with respect to function sharing between the BBU and RAU. As an example thereof, plans have been studied, such as a plan in which the entirety of a plurality of types of processing of Layer 1 are implemented by RAU, and processing of Layer 2 or higher is implemented by the BBU; a plan in which a part of the processing of Layer 1 is implemented by the RAU side, the remaining processing of Layer 1 and the processing of Layer 2 or higher are implemented by the BBU side, and so forth.

In addition, it has been studied to use a network such as a passive optical network (PON) in which one optical fiber is shared at a plurality of bases, and Ethernet (registered trademark) for the FH (FIG. 2) to achieve the FH that is cheaper than the CPRI. The networks are shared at the plurality of bases, and thus it is considered that a control of a transmission amount through the FH is required in correspondence with a variation of a signal quantity between the bases.

In addition, it is assumed that processing capability of the RAU is relatively lower than that of the BBU. Accordingly, if the transmission amount of the FH is simply reduced, a processing load on the RAU is to be increased. Accordingly, there is a need for a structure capable of appropriately switching the function sharing between the BBU and the RAU, while considering the processing load on the RAU, communication quality with user equipment, etc.

The disclosed technology has been developed in view of the above-described situations, and an object is to provide a technology capable of appropriately switching function sharing between a BBU and an RAU in a radio communication network by C-RAN.

Means for Solving the Problem

The radio communication system according to the disclosed technology is a radio communication system provided with a first base station, a second base station that communicates with the first base station, and user equipment that communicates with the first base station, the radio communication system including a determiner that determines, based on a predetermined reference value, sharing between signal processing that is to be performed by the first base station and signal processing that is to be performed by the second base station; a first signal processor for the first base station to perform the signal processing in accordance with the sharing determined by the determiner; and a second signal processor for the second base station to perform the signal processing in accordance with the sharing determined by the determiner.

Advantage of the Invention

According to the disclosed technology, a technology is provided, which is capable of appropriately switching function sharing between a BBU and an RAU in a radio communication network based on a C-RAN.

BRIEF DESCRIPTION OF DRAWINGS

FIG. 5 is a sequence diagram illustrating an example of a procedure for switching the function sharing in a UL;

FIG. 6 is a sequence diagram illustrating an example of a procedure for switching the function sharing in a DL;

EMBODIMENTS OF THE INVENTION

Figure 1:
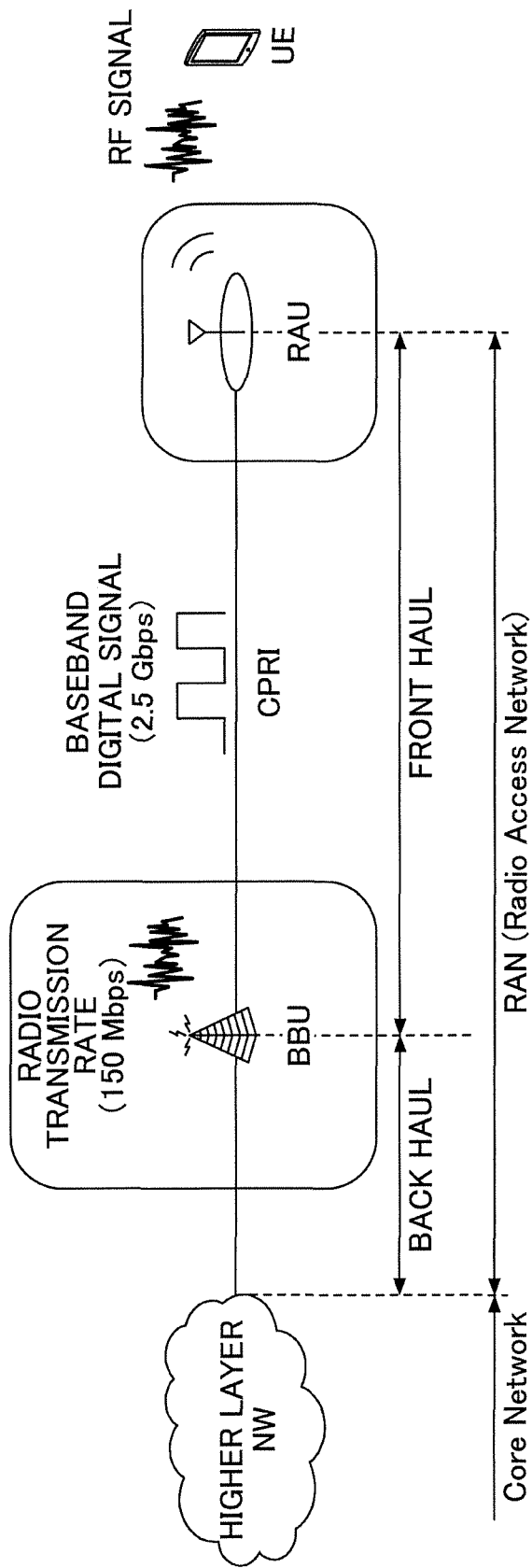
FIG. 1 is a diagram illustrating a frequency band required for an FH.
Figure 2:
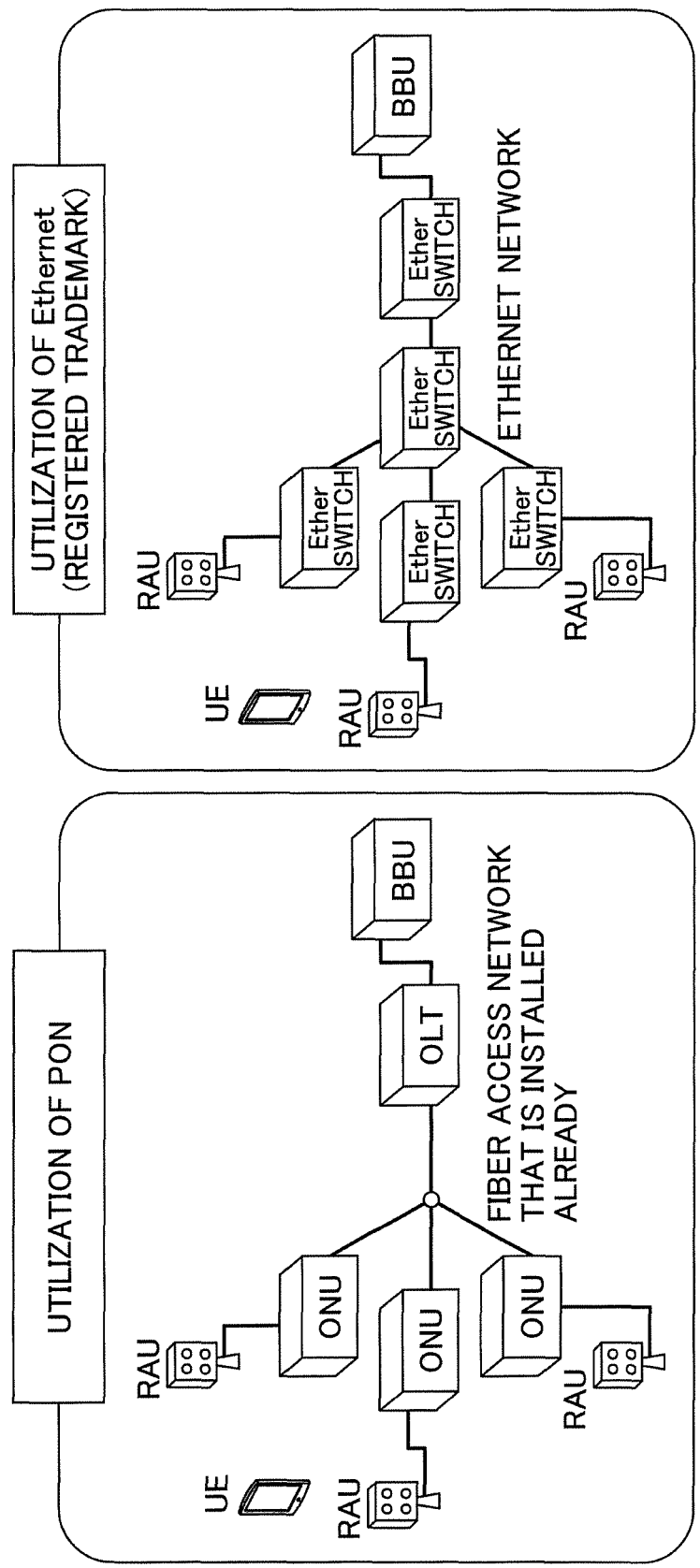
FIG. 2 is a diagram illustrating an example of a network that has been studied to be used in the FH.

Embodiments of the present invention are described below by referring to the drawings. Note that, the following embodiment is illustrative only, and an embodiment to which the invention is applicable is not limited to the following embodiment. For example, in a radio communication system according to this embodiment, a system based on a scheme conforming to LTE or 5G is assumed; however, the present invention is not limited to LTE or 5G, and the present invention can be applied to another scheme. Note that, in the specification and the claims, "LTE" is used in wide meaning including, not only communication schemes corresponding to Release 8 or 9 of 3GPP, but also Releases 10, 11, 12, and 13 of 3GPP, or the fifth generation communication scheme corresponding to on and after Release 14.

<System Configuration>

Figure 3:
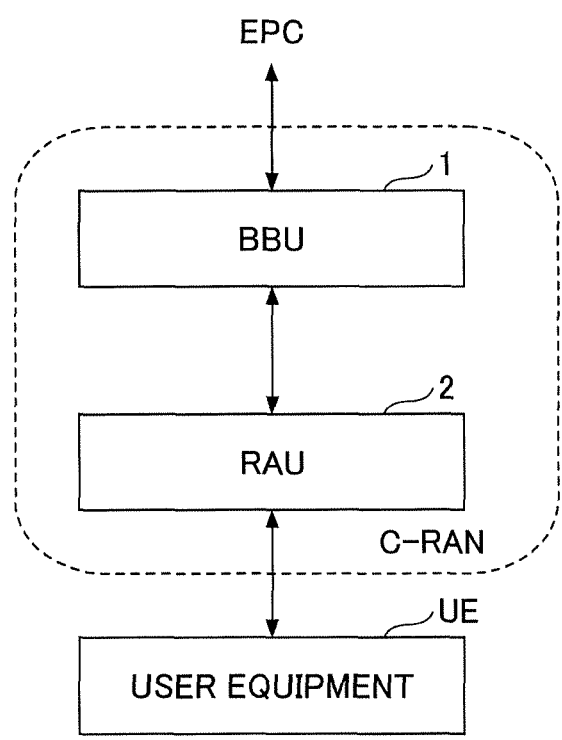
FIG. 3 is a diagram illustrating a system configuration example of a radio communication system according to an embodiment.

FIG. 3 is a diagram illustrating a system configuration example of the radio communication system according to this embodiment. As illustrated in FIG. 3, the radio communication system according to this embodiment includes a BBU 1, an RAU 2, and user equipment UE. In FIG. 3, one RAU 2 is illustrated, but two or more RAUs 2 may be included. That is, the BBU 1 may be configured to control a plurality of the RAUs 2.

The BBU 1 may be referred to as an aggregate base station, a master station, or a base station (enhanced Node B (eNB)) in a simple manner. The RAU 2 may be referred to as a satellite base station, a slave station, or a base station in a simple manner. The BBU 1 and the RAU 2 transmit and receive a predetermined signal through an FH.

<Function Sharing Between BBU and RAU>

Figure 4A:
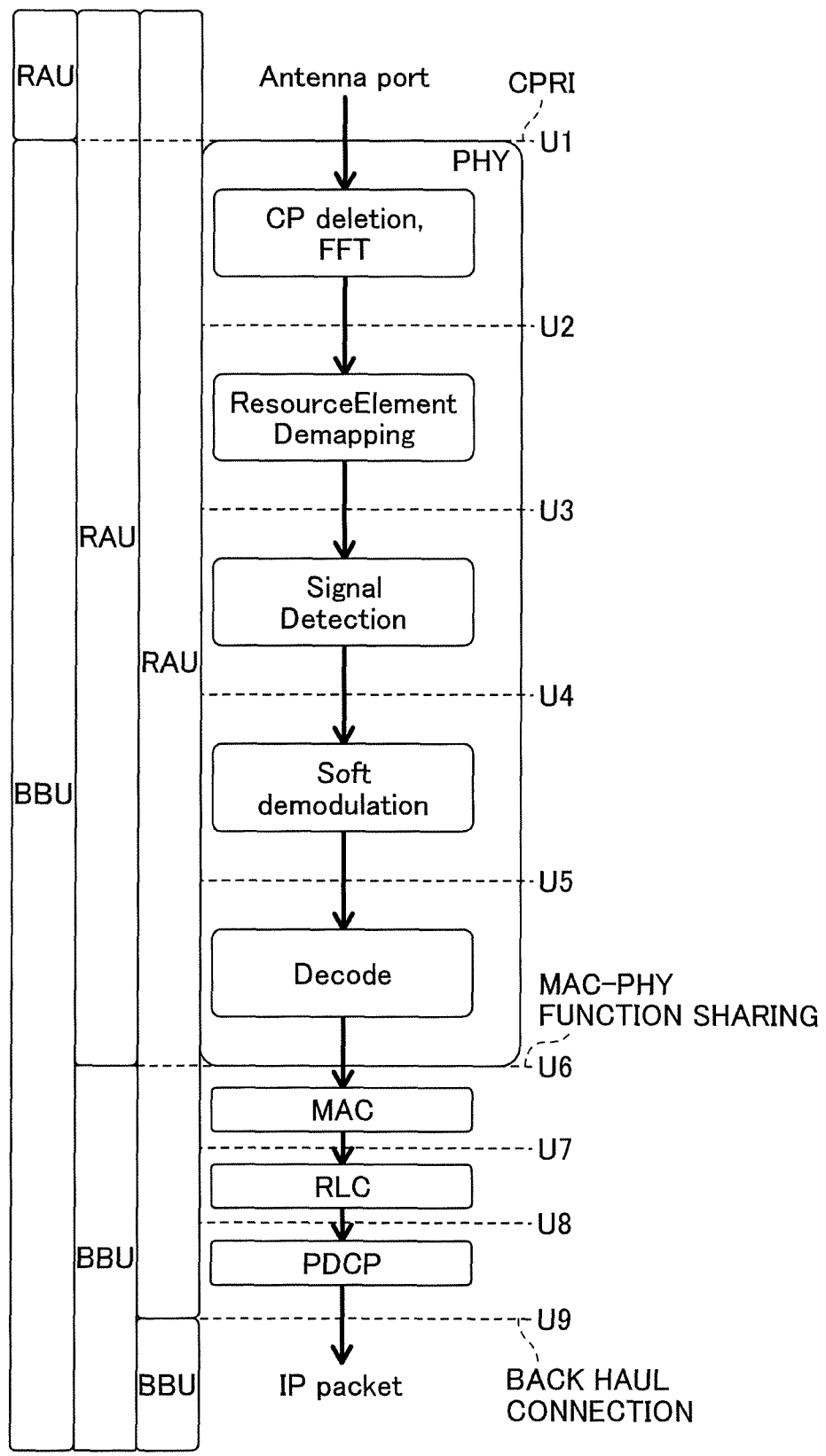
FIG. 4A is a diagram illustrating a function sharing example between a BBU and an RAU.
Figure 4B:
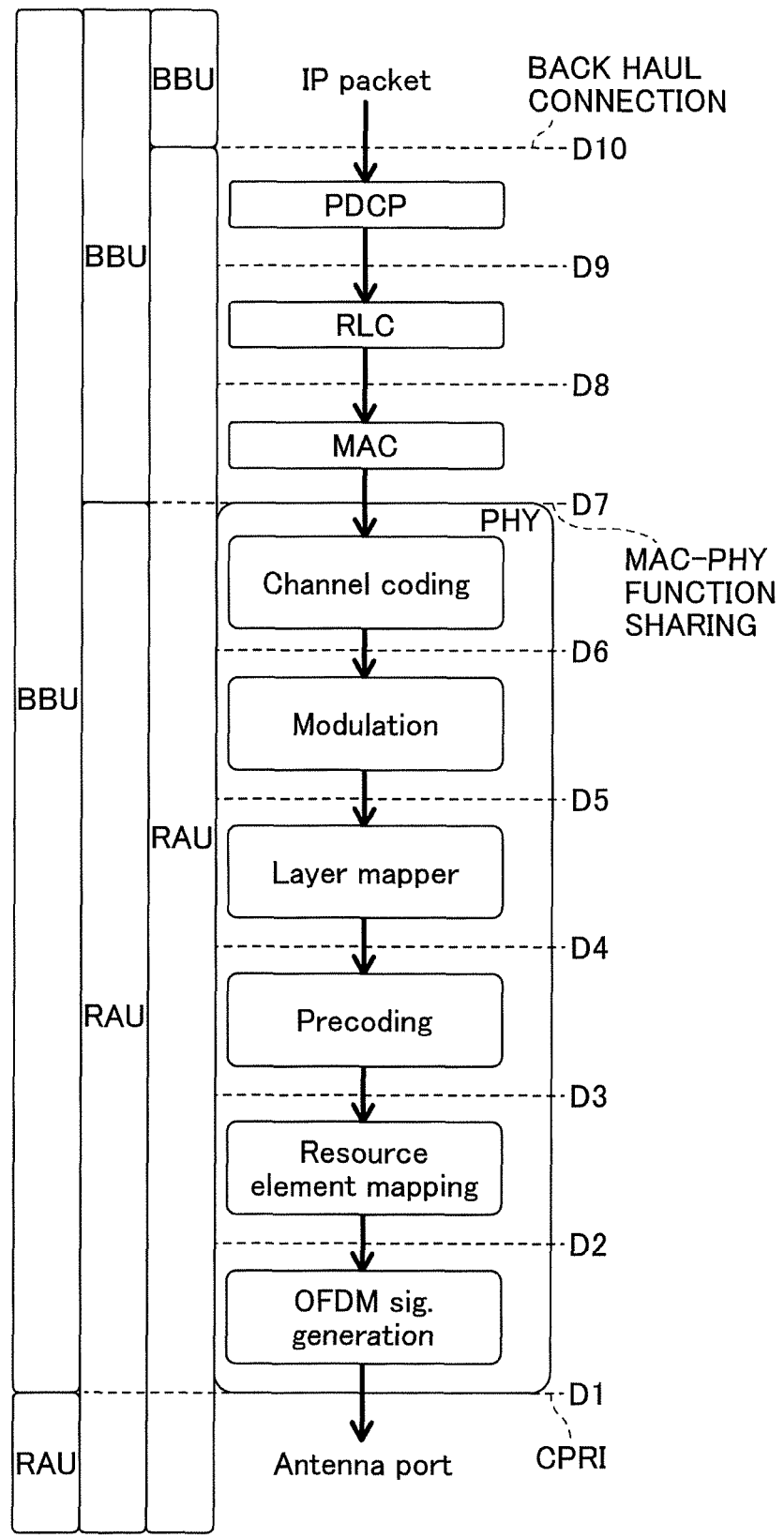
FIG. 4B is a diagram illustrating the function sharing example between the BBU and the RAU.

FIG. 4 is a diagram illustrating a function sharing example between a BBU and an RAU. FIG. 4A illustrates a function sharing example in a UL, and FIG. 4B illustrates a function sharing example in a DL. Boundaries "U1" to "U9" in FIG. 4A represent boundaries of a plurality of types of processing of UL which are respectively performed in the BBU 1 and the RAU 2. For example, in the case of function sharing in the boundary "U6", processing according to a function of Layer 2 or higher is performed on a BBU 1 side, and processing according to a function of Layer 1 is performed on an RAU 2 side. Furthermore, for example, in the case of function sharing at the boundary "U2", among a plurality of types of processing according to the function of Layer 1, processing up to an FFT is performed on the RAU 2 side, and processing subsequent to resource demapping (resource element demapping) is performed on the BBU 1 side. The boundary "U1" corresponds to a configuration of connecting the BBU 1 and the RAU 2 by using a CPRI. Furthermore, in a case where a communication by a MIMO is not performed in the UL, signal detection processing is omitted.

Similarly, boundaries "D1" to "D10" in FIG. 4B represent boundaries of a plurality of types of processing of the DL which are respectively performed in the BBU 1 and the RAU 2. For example, in the case of function sharing at the boundary "D7", processing according to the function of Layer 2 or higher is performed on the BBU 1 side, and processing according to the function of Layer 1 is performed on the RAU 2 side. In addition, for example, in the case of function sharing at the boundary "D2", among the plurality of types of processing according to the function of Layer 1, processing up to resource element mapping is performed on the BBU 1 side, and OFDM signal generation is performed on the RAU 2 side. The boundary "D1" corresponds to a configuration of connecting the BBU 1 and the RAU 2 by using the CPRI. Furthermore, when communication by the MIMO is not performed in the DL, a layer mapping (Layer mapper) process and a precoding (Precoding) process are omitted.

The BBU 1 and the RAU 2 according to this embodiment are capable of optionally switching, at which boundary among the boundaries "U1" to "U9" in the UL, the function sharing is to be made (signal processing is to be shared). Similarly, the BBU 1 and the RAU 2 according to this embodiment are capable of optionally switching, at which boundary among the boundaries "D1" to "D10" in the DL, the function sharing is to be made (signal processing is to be shared). Furthermore, the BBU 1 and the RAU 2 according to this embodiment may be configured to switch the function sharing in unit of the RAU 2 (that is, commonly in all units of the user equipment UE under the RAU 2), or may be configured to switch the function sharing in unit of the user equipment UE. In addition, switching may be made independently in the UL and the DL.

<Procedure>

(Switching of Function Sharing in UL)

FIG. 5 is a sequence diagram illustrating an example of a procedure for switching function sharing in the UL.

In step S101, the BBU 1 or the RAU 2 determine sharing (determine function sharing) between signal processing performed by the BBU 1 and signal processing performed by the RAU 2. In this embodiment, the boundaries ("U1" to "U9") of the function sharing between the BBU 1 and the RAU 2 may be determined in the BBU 1 or the RAU 2.

More specifically, the BBU 1 or the RAU 2 determines sharing between signal processing performed by the RAU 2 and signal processing performed by the BBU 1 on the basis of a predetermined reference value. For example, a table, in which a range of a predetermined reference value and the boundaries "U1" to "U9" in the UL are correlated one-to-one, is retained in the BBU 1 or the RAU 2. The BBU 1 or the RAU 2 may determine sharing between the signal processing performed by the RAU 2 and the signal processing performed by the BBU 1 by comparing the table and the predetermined reference value with each other. In addition, a predetermined threshold value may be retained in the BBU 1 or the RAU 2, and determination of a boundary, at which the function sharing is to be made among the boundaries "U1" to "U9", may be made through determination of whether or not the predetermined reference value is equal to or greater than the predetermined threshold value. Acquisition (measurement) of the predetermined reference value may be performed by the BBU 1 or the RAU 2. The BBU 1 or the RAU 2 may notify a counterpart (the RAU 2 or the BBU 1) of an acquisition result (or measurement result) as necessary. A specific example of the predetermined reference value will be described later.

The BBU 1 or the RAU 2 notifies a counterpart (the RAU 2 or the BBU 1) of the determination result of the function sharing. Furthermore, in a case where the RAU 2 makes a determination of the function sharing, the RAU 2 may apply an identifier, which indicates that signal processing according to which function has been performed on the RAU 2 side, to header information of a UL signal that is transmitted in a procedure of step S113 to be described later. According to this, the function sharing of the UL can be switched in a dynamic manner.

In step S111, the RAU 2 receives the UL signal transmitted from the user equipment UE. Subsequently, the RAU 2 performs signal processing to be performed by the RAU 2 (S112), and transmits a signal after being subjected to the signal processing to the BBU 1 (S113). Subsequently, the BBU 1 performs signal processing to be performed by the BBU 1 (S114).

Furthermore, the procedure in step S101 to S114 described above may be repetitively performed with a predetermined interval. According to this, for example, the function sharing of the UL can be changed in a dynamic manner on the basis of a variation in reception quality of the UL signal or a DL signal, a variation in a processing load of the RAU 2, and the like.

(Switching of Function Sharing in DL)

FIG. 6 is a sequence diagram illustrating an example of a procedure for switching function sharing in the DL. Furthermore, in this embodiment, the boundaries "D1" to "D10" of function sharing between the BBU 1 and the RAU 2 may be determined in the BBU 1 or the RAU 2.

In step S201, the BBU 1 or the RAU 2 determines sharing (determines function sharing) between signal processing performed by the BBU 1 and signal processing performed by the RAU 2. In this embodiment, the boundaries ("D1" to "D10") of the function sharing between the BBU 1 and the RAU 2 may be determined in the BBU 1 or the RAU 2.

More specifically, the BBU 1 or the RAU 2 determines sharing between signal processing performed by the RAU 2 and signal processing performed by the BBU 1 on the basis of a predetermined reference value. For example, a table, in which a range of a predetermined reference value and the boundaries "D1" to "D10" in the DL are correlated one-to-one, is retained in the BBU 1 or the RAU 2. The BBU 1 or the RAU 2 may determine sharing between the signal processing performed by the RAU 2 and the signal processing performed by the BBU 1 by comparing the table and the predetermined reference value with each other. In addition, a predetermined threshold value may be retained in the BBU 1 or the RAU 2, and the BBU 1 or the RAU 2 may determine that the function sharing is to be made at which boundary among the boundaries "D1" to "D10" through determination of whether or not the predetermined reference value is equal to or greater than the predetermined threshold value. Acquisition (measurement) of the predetermined reference value may be performed by the BBU 1 or the RAU 2. The BBU 1 or the RAU 2 may notify a counterpart (the RAU 2 or the BBU 1) of an acquisition result (or measurement result) as necessary.

The BBU 1 or the RAU 2 notifies a counterpart (the RAU 2 or the BBU 1) of the determination result of the function sharing. Furthermore, in a case where the BBU 1 makes a determination of the function sharing, the BBU 1 may apply an identifier, which indicates that signal processing according to which function has been performed on the BBU 1 side, to header information of a DL signal that is transmitted in a procedure of step S212 to be described later. According to this, the function sharing of the DL can be switched in a dynamic manner.

The BBU 1 performs signal processing to be performed by the BBU 1 with respect to the DL signal to be transmitted to the user equipment UE (S211), and transmits the DL signal after being subjected to the signal processing to the RAU 2 (S212). Subsequently, the RAU 2 performs signal processing to be performed by the RAU 2 (S213), and transmits the DL signal after being subjected to the signal processing to the user equipment UE (S214).

Furthermore, the procedure of step S201 to S214 described above may be repetitively performed with a predetermined interval. According to this, for example, the function sharing of the DL can be changed in a dynamic manner on the basis of a variation in reception quality of the UL signal or the DL signal, a variation in a processing load of the RAU 2, and the like.

(Example of Predetermined Reference Value)

For example, the predetermined reference value may be a value of a signal to interference plus noise power ratio (SINR) or a signal to noise ratio (SNR) of the UL signal received from the user equipment UE or the DL signal that is received by user equipment UE. As a table in which a range of the SINR or the SNR and the boundaries in the UL or the DL are correlated with each other, for example, a table, in which correlation of (boundaries "U9", "U8", "U7", "U6", "U5", "U4", "U3", "U2", and "U1") or (boundaries "D10", "D9", "D8", "D7", "D6", "D5", "D4", "D3", "D2", and "D1") is made in the order from a side in which the range of the SINR or the SNR is great, may be used. That is, as the SINR or the SNR becomes greater, the number of processing performed on the RAU 2 side may be set to increase. In addition, as another example, in a case where the SINR or the SNR is equal to or greater than a predetermined threshold value, the function sharing may be divided at a predetermined boundary in the UL or the DL (for example, the function sharing may be divided at "U6", "D7", and the like), and in a case where the SINR or the SNR is less than the predetermined threshold value, the function sharing may be divided at a predetermined boundary (for example, "U2", "D2", and the like) in the UL or the DL.

Acquisition (measurement) of the SINR or the SNR may be performed in the RAU 2 or the BBU 1. In addition, in a case where the function sharing is switched for each user equipment UE, the RAU 2 or the BBU 1 may acquire (measure) the SINR or the SNR for each user equipment UE on the basis of series of a reference signal or a resource position allocated to the user equipment UE. In this case, the RAU 2 may be notified of the series of the reference signal or the resource position allocated to the user equipment UE from the BBU 1 in advance. In addition, in the case of switching the function sharing in units of the RAU 2, for example, the switching of the function sharing per unit of the RAU 2 may be allowed by dividing scheduling time of a radio resource of the DL or UL for each user equipment UE.

In addition, the predetermined reference value may be a CRC (Cyclic Redundancy Check) success rate of the UL signal that is received from the user equipment UE or the DL signal that is received by the user equipment UE. The CRC success rate represents a probability of determination as being correct in the CRC that is included in a radio signal transmitted through a predetermined physical channel. In a case where radio quality between the user equipment UE and the RAU 2 deteriorates, the CRC success rate decreases.

As a table in which a range of the CRC success rate and the boundaries in the UL or the DL are correlated with each other, for example, a table, in which correlation of (boundaries "U9", "U8", "U7", "U6", "U5", "U4", "U3", "U2", and "U1") or (boundaries "D10", "D9", "D8", "D7", "D6", "D5", "D4", "D3", "D2", and "D1") is made in the order from a side in which a range of the CRC success rate is high, may be used. That is, as the CRC success rate is high, the number of processing performed on the RAU 2 side may be set to increase. In addition, as another example, in a case where the CRC success rate is equal to or greater than a predetermined threshold value, the function sharing may be divided at a predetermined boundary in the UL or the DL (for example, the function sharing may be divided at "U6", "D7", and the like), and in a case where the CRC success rate is less than the predetermine threshold value, the function sharing may be divided at a predetermined boundary (for example, "U2", "D2", and the like) in the UL or the DL.

Acquisition (measurement) of the CRC success rate may be performed by the RAU 2 or the BBU 1. Furthermore, the CRC check is performed when performing decoding processing, and thus it is preferable that a device (BBU 1 or RAU 2), which performs processing according to the decoding, performs acquisition of the CRC success rate.

In addition, the predetermined reference value may be the number of retransmission times of the UL signal or the DL signal from the user equipment UE in a predetermined period (or an average value of the number of retransmission times in the predetermined period). For example, the number of retransmission times of the DL signal to the user equipment UE in a predetermined period may be counted by the number of notification times of NAK by PUCCH or PUSCH.

As a table in which a range of the number of retransmission times and the boundaries in the UL or the DL are correlated with each other, for example, a table, in which correlation of (boundaries "U9", "U8", "U7", "U6", "U5", "U4", "U3", "U2", and "U1") or (boundaries "D10", "D9", "D8", "D7", "D6", "D5", "D4", "D3", "D2", and "D1") is made in the order from a side in which a range of the number of retransmission times is small, may be used. That is, as the number of retransmission times is small, processing performed on the RAU 2 side may be set to increase. In addition, as another example, in a case where the number of retransmission times is less than a predetermined threshold value, the function sharing may be divided at a predetermined boundary (for example, "U6", "D7", and the like) in the UL or the DL, and in a case where the number of retransmission times is equal to or greater than the predetermined threshold value, the function sharing may be divided at a predetermined boundary (for example, "U2", "D2", and the like) in the UL or the DL.

Acquisition (measurement) of the number of retransmission times may be performed in the RAU 2 or the BBU 1. Furthermore, reception of the NAK is performed with a signal after being decoded, and thus it is preferable that the acquisition of the number of retransmission times is performed by a device (the BBU 1 or the RAU 2) that performs processing in accordance with decoding.

In addition, the predetermined reference value may be a channel estimation error of the UL signal that is received from the user equipment UE or the DL signal that is received by the user equipment UE. The channel estimation error represents an index indicating that a variation (dispersion) occurs to a certain extent between an average value of results obtained by performing channel estimation by using a plurality of reference signals included in the UL signal that is received from the user equipment UE or the DL signal which the user equipment UE receives, and a result obtained by performing channel estimation of each of the reference signals. In a case where radio quality between the user equipment UE and the RAU 2 deteriorates, the channel estimation error increases.

As a table in which a range of the channel estimation error and the boundaries in the UL or the DL are correlated with each other, for example, a table, in which correlation of (boundaries "U9", "U8", "U7", "U6", "U5", "U4", "U3", "U2", and "U1") or (boundaries "D10", "D9", "D8", "D7", "D6", "D5", "D4", "D3", "D2", and "D1") is made in the order from a side in which a range of the channel estimation error is small, may be used. That is, as the range of the channel estimation error is small, processing performed on the RAU 2 side may be set to increase. In addition, as another example, in a case where the channel estimation error is less than a predetermined threshold value, the function sharing may be divided at a predetermined boundary (for example, "U6", "D7", and the like) in the UL or the DL, and in a case where the channel estimation error is equal to or greater than the predetermined threshold value, the function sharing may be divided at a predetermined boundary (for example, "U2", "D2", and the like) in the UL or the DL.

In addition, the predetermined reference value may be the magnitude of a processing load of the RAU 2 (a processor utilization rate, a memory utilization rate, the amount of data between the BBU 1 and the RAU 2, and the like). As a table in which a range of the magnitude of the processing load of the RAU 2 and the boundaries in the UL or the DL are correlated with each other, for example, a table, in which correlation of (boundaries "U1", "U2", "U3", "U4", "U5", "U6", "U7", "U8", and "U9") or (boundaries "D1", "D2", "D3", "D4", "D5", "D6", "D7", "D8", "D9", and "D10") is made in the order from a side in which a range of the processing load of the RAU 2 is great, may be used. That is, as the processing load of the RAU 2 is great, processing of Layer 1, which is performed on the RAU 2 side, is set to decrease. In addition, as another example, in a case where the magnitude of the processing load of the RAU 2 is less than a predetermined threshold value, the function sharing may be divided at a predetermined boundary (for example, "U6", "D7", and the like) in the UL or the DL, and in a case where the magnitude of the processing load is equal to or greater than the predetermined threshold value, the function sharing may be divided at a predetermined boundary (for example, "U2", "D2", and the like) in the UL or the DL.

The processing load of the RAU 2 may be measured by the RAU 2, or may be estimated by the BBU 1 on the basis of the amount of data transmitted to the RAU 2 from the BBU 1, the amount of data that is scheduled by the BBU 1 with respect to the RAU 2, and the like.

In addition, the predetermined reference value may relate to whether or not the number of antennas provided to the user equipment UE is equal to or greater than, or less than the number of antennas provided to the RAU 2. For example, in a case where the number of antennas provided to the RAU 2 is equal to or greater than the number of antennas provided to the user equipment UE, it is determined that reception quality of the UL signal may be highly satisfactory due to a diversity effect, and the function sharing may be divided at a boundary (for example, "U6" and the like) in order for much signal processing to be performed on the RAU 2 side in which a possibility of performing processing of Layer 1 by a relatively simple processing method is high. In contrast, in a case where the number of antennas provided to the RAU 2 is less than the number of antenna provided to the user equipment UE, the function sharing may be divided at a boundary (for example, "U2" and the like) in order for much signal processing to be performed on the BBU 1 side.

In addition, the predetermined reference value may be a ration between the number of antennas provided to the user equipment UE and the number of antennas provided to the RAU 2. In this case, a table, in which correlation of (boundaries "U9", "U8", "U7", "U6", "U5", "U4", "U3", "U2", and "U1") or (boundaries "D10", "D9", "D8", "D7", "D6", "D5", "D4", "D3", "D2", and "D1") is made in the order from a side in which the ratio of the number of antennas provided to the user equipment UE is great, may be used.

Furthermore, the user equipment UE may notify the BBU 1 of the number of antennas provided to the user equipment UE at a higher layer, etc. It is assumed that the number of antennas is different for each user equipment UE, and thus an average value of the number of antennas, which is notified from the user equipment UE in a predetermined period, may be regarded as the number of antennas which are provided to the user equipment UE.

(Operation Example of Function Sharing Switching Processing in UL)

FIG. 7 is a diagram illustrating an operation example of function sharing switching processing in the UL. FIG. 7 illustrates an operation example in the case of using the SINR as the predetermined reference value. Furthermore, in FIG. 7, a part of various types of signal processing of Layer 1 as illustrated in FIG. 4A is not illustrated, and boundaries "U2", "U4", and "U6" illustrated in FIG. 7 respectively correspond to the boundaries "U2", "U4", and "U6" illustrated in FIG. 4A. In addition, the boundaries illustrated in FIG. 7 are illustrative only, and there is no limitation the boundaries. For example, the boundary "U2" in FIG. 7 may be the boundary "U3", and the boundary "U4" in FIG. 7 may be the boundary "U5". In addition, although not illustrated in FIG. 7, the function sharing may be switched at any one of boundaries "U1", and "U7" to "U9".

In addition, in the example of FIG. 7, it is assumed that the user equipment UE performs UL signal transmission by an SU-MIMO. It is assumed that the RAU 2 has a function of performing simple reception signal detection by using, for example, a minimum mean squared error (MMSE), and the like as a signal detection (signal separation) method of the MIMO, and the BBU 1 has a function of performing high-accuracy reception signal detection by using, for example, maximum likelihood detection (MLD) and the like. In addition, description is made on the assumption that the BBU 1 has a function of measuring the SINR of the UL signal that is received from the user equipment UE, and determination of the function sharing is made on the BBU 1 side on the basis of the SINR measured in the BBU 1.

Figure 7A:
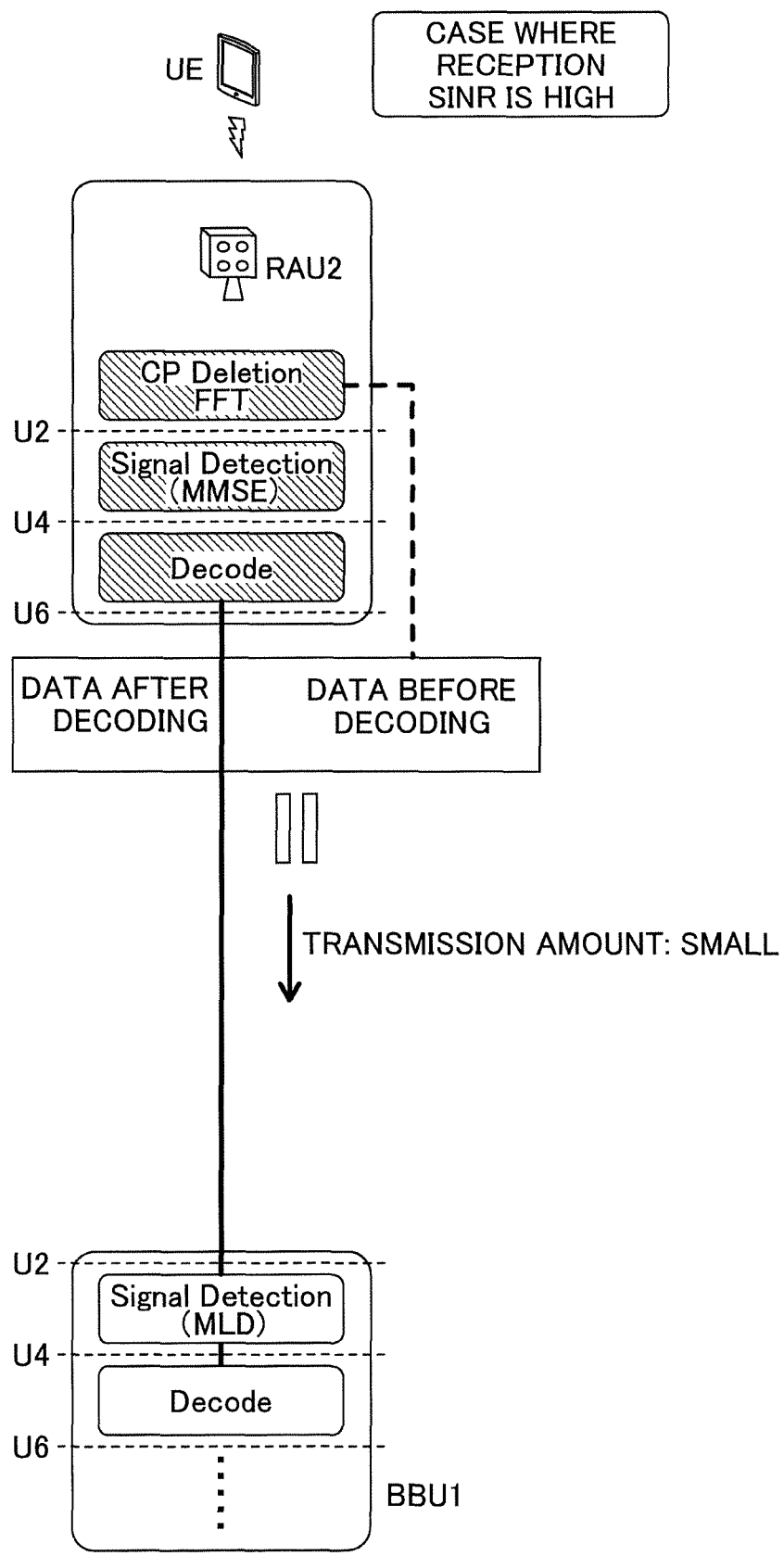
FIG. 7A is a diagram illustrating an operation example of a process for switching the function sharing in the UL.

As illustrated in FIG. 7A, in a case where the SINR of the UL signal received from the user equipment UE is equal to or greater than a predetermined threshold value, that is, reception quality of the UL signal is satisfactory, the BBU 1 determines that the entirety of a plurality of types of signal processing in accordance with Layer 1 are performed on the RAU 2 side (determines that function sharing is made at the region "U6"). Subsequently, the BBU 1 notifies the RAU 2 of the determination result.

The RAU 2 performs the entirety of the plurality of types of signal processing in accordance with Layer 1 on the basis of the determination result that is transmitted in the notification, and transmits a UL signal that is decoded to the BBU 1 through the FH. In the case of FIG. 7A, in the BBU 1, the signal processing according to Layer 1 is not performed, and signal processing subsequent to Layer 2 is performed.

Figure 7B:
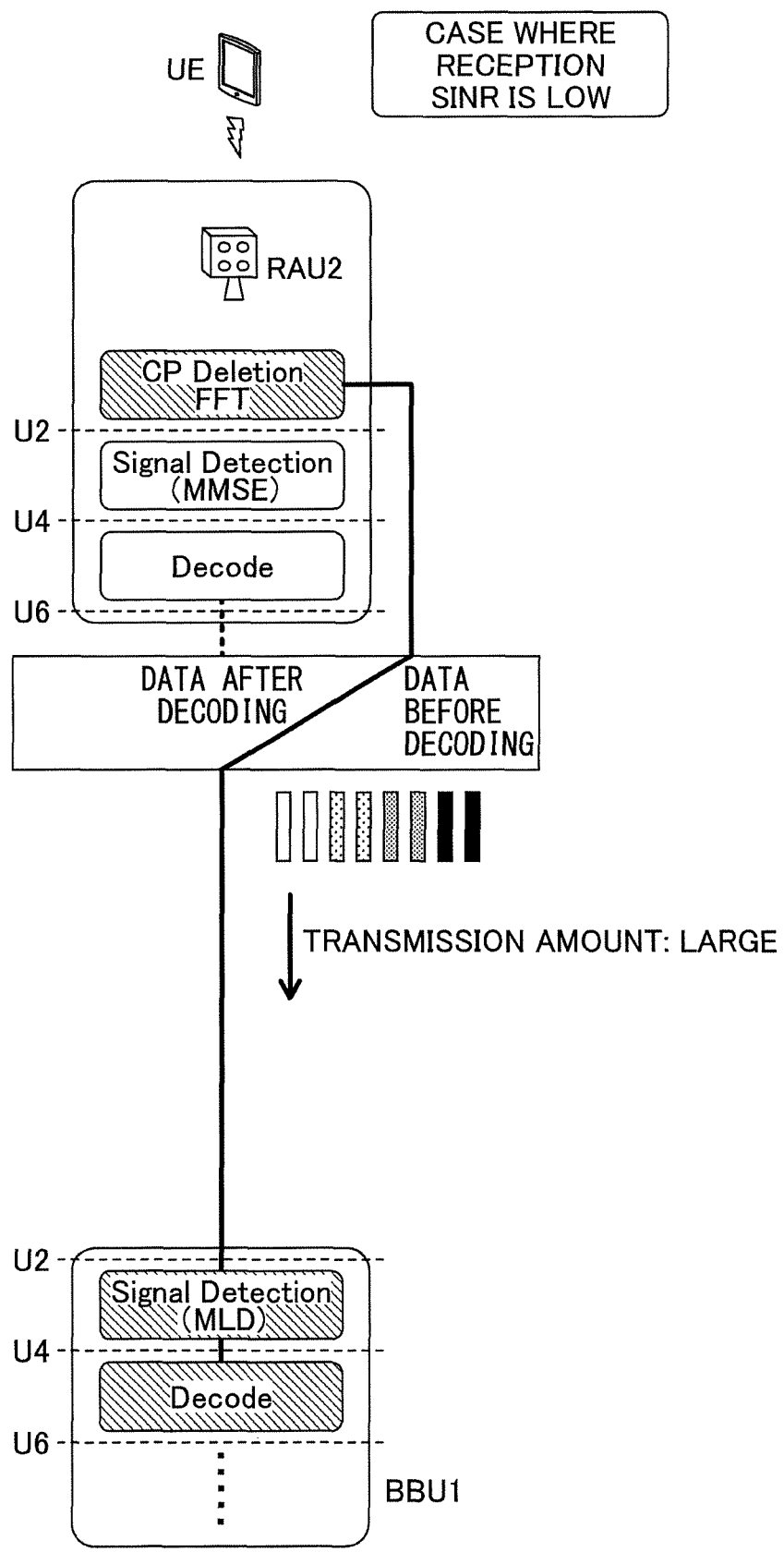
FIG. 7B is a diagram illustrating the operation example of the process for switching the function sharing in the UL.

In contrast, as illustrated in FIG. 7B, in a case where the SINR of the UL signal received from the user equipment UE is less than a predetermined threshold value, that is, in a case where reception quality of the UL signal is not satisfactory, the BBU 1 determines that among the plurality of types of signal processing according to Layer 1, processing up to FFT processing is performed on the RAU 2 side, and the subsequent signal processing is performed on the BBU 1 side (determines that function sharing is made at the boundary "U2"). Then, the BBU 1 notifies the RAU 2 of the determination result.

The RAU 2 performs signal processing up to the FFT processing among the plurality of types of signal processing according to Layer 1 on the basis of the determination result that is transmitted in the notification, and transmits the UL signal after the FFT processing to the BBU 1 through the FH. In the case of FIG. 7B, in the BBU 1, signal processing according to Layer 1 after the FFT processing (that is, processing of Layer 1 after resource demapping), and signal processing subsequent to Layer 2 are performed.

Furthermore, in the above-described operation example, in a case where function sharing is switched for each user equipment UE, the BBU 1 may notify the RAU 2 of a determination result for each user equipment UE and information (for example, a radio resource position in a frequency direction, and the like) for identification of the user equipment UE in correlation with each other so that the RAU 2 can recognize that which radio resource is scheduled to which user equipment UE on the RAU 2 side.

According to this operation, in a case where reception quality of the UL signal received from the user equipment UE is satisfactory, the entirety of the plurality of types of signal processing of Layer 1 are performed on the RAU 2 side, and thus it is possible to secure reception performance of the UL signal while reducing the transmission amount through the FH. Furthermore, since the transmission amount through the FH is reduced, it is possible to suppress occurrence of transmission delay. In contrast, in a case where reception quality of the UL signal received from the user equipment UE is not satisfactory, high-accuracy reception signal detection is performed on the BBU 1 side, and thus it is possible to secure reception performance of the UL signal.

(Operation Example of Function Sharing Switching Processing IN DL)

FIG. 8 is a diagram illustrating an operation example of the function sharing switching processing in the DL. FIG. 8 illustrates an operation example in the case of using a processing load of the RAU 2 as a predetermined reference value. Furthermore, in FIG. 8, a part of the plurality of types of signal processing of Layer 1, which are illustrated in FIG. 4B, is omitted. Boundaries "D2", "D4", and "D7" illustrated in FIG. 8 respectively correspond to the boundaries "D2", "D4", and "D7" illustrated in FIG. 4B. The boundaries illustrated in FIG. 8 are illustrative only, and there is no limitation to the boundaries. For example, the boundary "D2" in FIG. 8 may be the boundary "D3", and the boundary "D4" in FIG. 8 may be the boundary "D6" or "D7". In addition, although not illustrated in FIG. 8, the function sharing may be switched at any one of the boundaries "D1", and "D8" to "D10".

In an example of FIG. 8, description is made on the assumption that the RAU 2 measures a processing load thereof and notifies the BBU 1 of the processing load, and the function sharing is determined on the BBU 1 side.

Figure 8A:
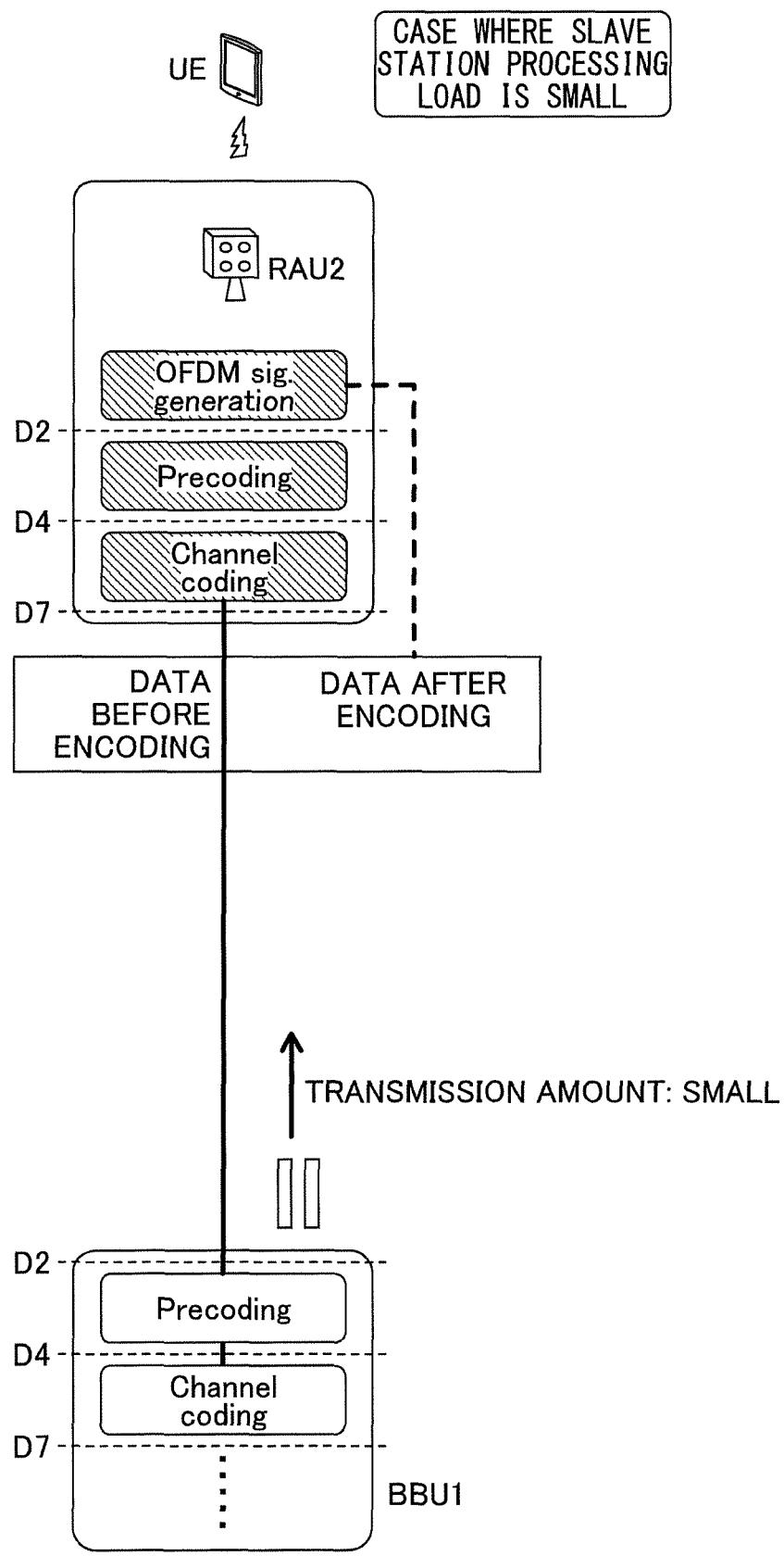
FIG. 8A is a diagram illustrating an operation example of a process for switching the function sharing in the DL.

As illustrated in FIG. 8A, in a case where the processing load of the RAU 2 is less than a predetermined threshold value, the BBU 1 determines that the entirety of the plurality of signal processing according to Layer 1 are performed on the RAU 2 side (determines that function sharing is made at the boundary "D7"). Furthermore, BBU 1 transmits a DL signal that is subjected to the signal processing according to Layer 2 to the RAU 2 through the FH on the basis of the determination result. In addition, when transmitting the DL signal to the RAU 2, the BBU 1 may perform the transmission by applying a predetermined header to the DL signal, and by applying an identifier, which indicates that signal processing up to Layer 2 has been performed, to the header. In the case of FIG. 8A, in the RAU 2, the entirety of the plurality of types of signal processing according to Layer 1 are performed.

Figure 8B:
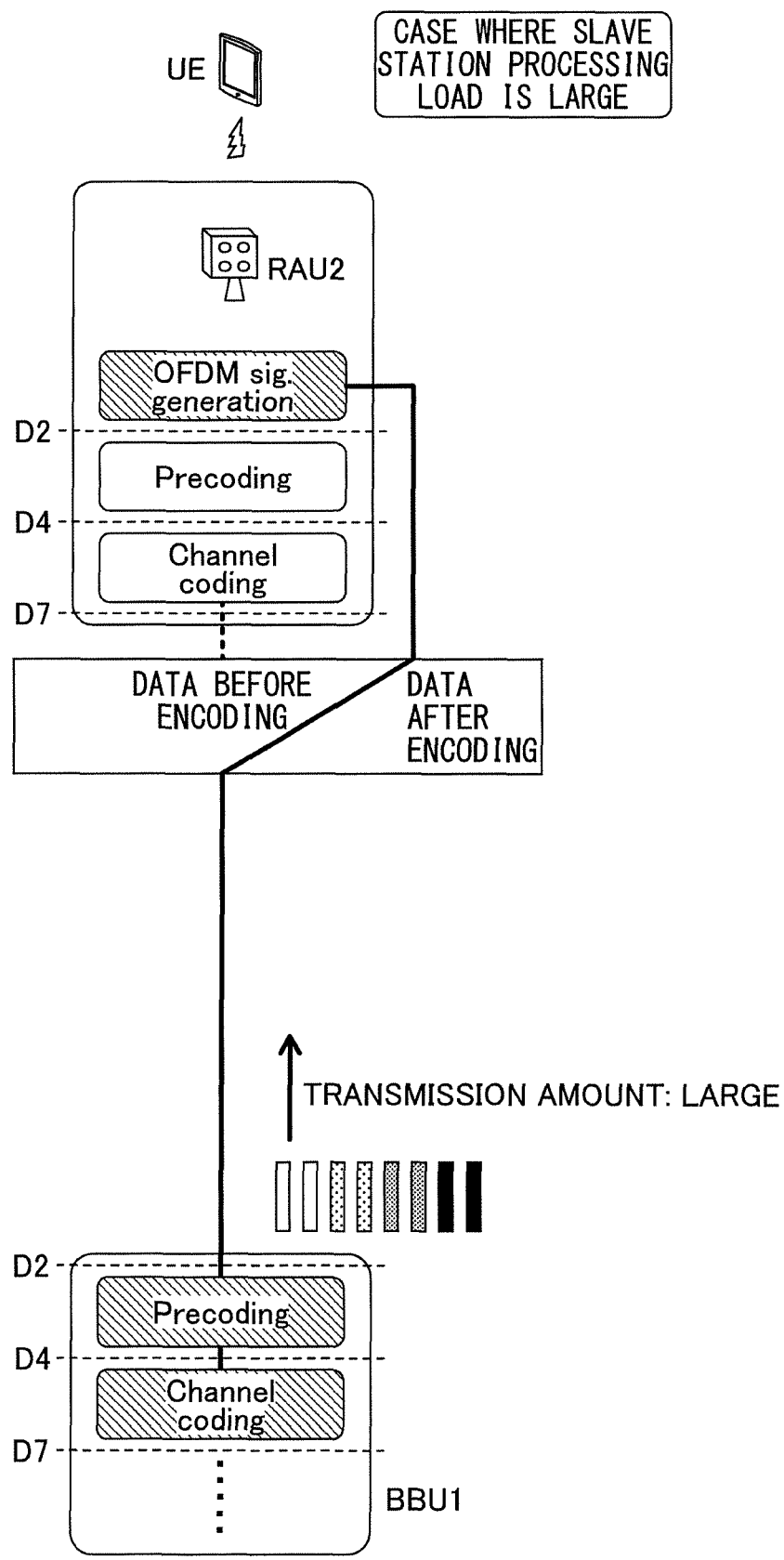
FIG. 8B is a diagram illustrating the operation example of the process for switching the function sharing in the DL.

In contrast, as illustrated in FIG. 8B, in a case where the processing load of the RAU 2 is equal to or greater than a predetermined threshold value, the BBU 1 determines that among the plurality of types of signal processing according to Layer 1, processing up to resource element mapping is performed on the BBU 1 side (determines that function sharing is made at the boundary "D2"). In addition, the BBU 1 transmits the DL signal, which is subjected to the signal processing up to the resource element mapping, to the RAU 2 through the FH on the basis of the determination result. Furthermore, when transmitting the DL signal to the RAU 2, the BBU 1 may perform the transmission by applying a predetermined header to the DL signal, and by applying an identifier, which indicates that signal processing up to the resource element mapping has been performed, to the header. In the case of FIG. 8B, in the RAU 2, signal processing in accordance with OFDM signal generation is performed.

According to this operation, when the processing load of the RAU 2 is tight, more types of signal processing are set to be performed on the BBU 1 side, and thus it is possible to reduce the processing load of the RAU 2. In addition, in a case where the processing load of the RAU 2 is low, more types of signal processing are set to be performed on the RAU 2 side, and thus it is possible to reduce the transmission amount through the FH. In addition, since the transmission amount through the FH is reduced, it is possible to suppress occurrence of transmission delay.

(Supplementary Item with Respect to Procedure)

When function sharing is changed, the BBU 1 or the RAU 2 may stop scheduling of the DL and the UL for a predetermined period of time. According to this, it is possible to avoid a possibility that the function sharing is changed during transmission of the DL signal or the UL signal, and thus a signal is damaged.

<Functional Configuration>

A functional configuration example of the BBU 1 and the RAU 2 is described, which are for implementing the operation of the above-described embodiment.

(BBU)

Figure 9:
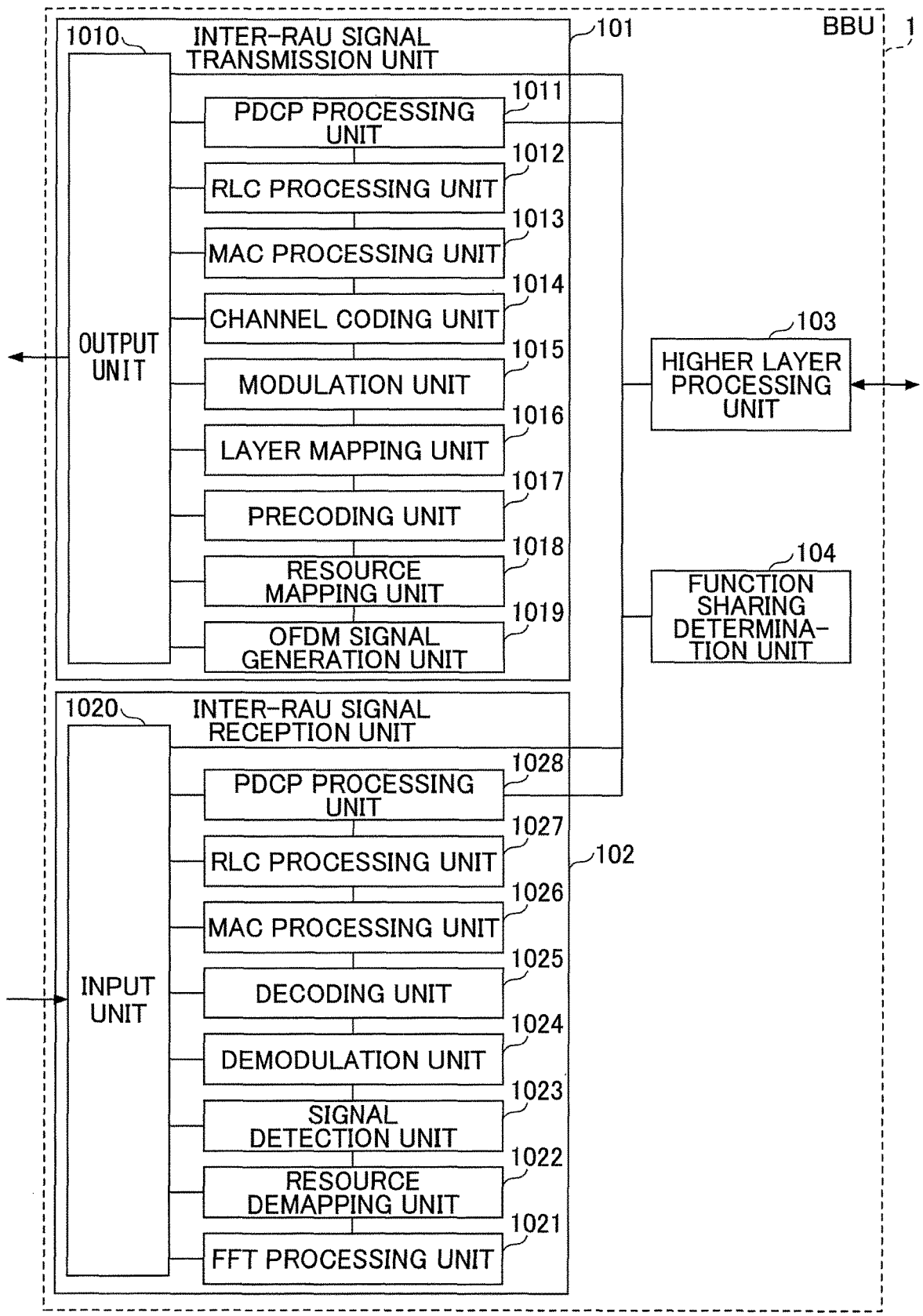
FIG. 9 is a diagram illustrating a functional configuration example of the BBU according to the embodiment.

FIG. 9 is a diagram illustrating a functional configuration example of the BBU according to this embodiment. As illustrated in FIG. 9, the BBU 1 includes an inter-RAU signal transmission unit 101, an inter-RAU signal reception unit 102, a higher layer processing unit 103, and a function sharing determination unit 104. Furthermore, FIG. 9 illustrates only function units, which particularly related to this embodiment, of the BBU 1, and the BBU 1 also has a function (not illustrated) of performing at least an operation in conformity to LTE (including 5G). In addition, the functional configuration illustrated in FIG. 9 is illustrative only. Function division and the names of the function units may be arbitrary as long as the operation according to this embodiment can be executed.

The inter-RAU signal transmission unit 101 has a function of performing signal processing with respect to a DL signal received from the higher layer processing unit 103 on the basis of function sharing as a notification from the function sharing determination unit 104 or the RAU 2 to generate a signal, and of transmitting the signal that is generated to the RAU 2 through the FH. The inter-RAU signal reception unit 102 has a function of performing signal processing with respect to an UL signal received from the RAU 2 through the FH on the basis of the function sharing as a notification from the function sharing determination unit 104 or the RAU 2, and of transmitting the resultant signal to the higher layer processing unit 103. The inter-RAU signal transmission unit 101 and the inter-RAU signal reception unit 102 include a function as an interface of a predetermined protocol that is used in the FH.

The higher layer processing unit 103 includes a function of performing signal processing of layers higher than Layer 2, and a function of transmitting a signal, which is subjected to signal processing up to Layer 2 or signal processing of the layers higher than Layer 2, to a core network and the like.

The function sharing determination unit 104 includes a function of determining sharing between signal processing that is performed by the RAU 2 and signal processing that is performed by the BBU 1 on the basis of a predetermined reference value.

In addition, the inter-RAU signal transmission unit 101 is classified into a PDCP processing unit 1011 as a processing unit that performs signal processing of the DL of Layer 2, an RLC processing unit 1012, a MAC processing unit 1013, a channel coding unit 1014 as a processing unit that performs signal processing of the DL of Layer 1, a modulation unit 1015, a layer mapping unit 1016, a precoding unit 1017, a resource mapping unit 1018, and an OFDM signal generation unit 1019. In addition, the inter-RAU signal transmission unit 101 includes an output unit 1010. The PDCP processing unit 1011 performs various types of processing in accordance with a PDCP sub-layer. The RLC processing unit 1012 performs various types of processing in accordance with the RLC sub-layer. The MAC processing unit 1013 performs various types of processing in accordance with a MAC sub-layer. The channel coding unit 1014 performs processing such as addition of CRC bits, code block division, and rate matching with respect to the DL signal received from the higher layer processing unit 103. The modulation unit 1015 modulates a bit stream by using a predetermined modulation method. The layer mapping unit 1016 maps a modulation symbol to respective layers. The precoding unit 1017 performs precoding processing with respect to the modulation symbol of the respective layers to map the modulation symbol of the respective layers to respective antenna ports. The resource mapping unit 1018 maps the modulation symbol, which is transmitted from the respective antenna ports, to a predetermined resource element. The OFDM signal generation unit 1019 performs IFFT processing with respect to a signal of a frequency region that is mapped to a resource element to generate an OFDM signal. The output unit 1010 extracts a signal, which is generated by any one of the higher layer processing unit 103, the PDCP processing unit 1011, the RLC processing unit 1012, the MAC processing unit 1013, the channel coding unit 1014, the modulation unit 1015, the layer mapping unit 1016, the precoding unit 1017, the resource mapping unit 1018, and the OFDM signal generation unit 1019, on the basis of the function sharing as a notification from the function sharing determination unit 104 or the RAU 2, and transmits the signal to the RAU 2.

In addition, the inter-RAU signal reception unit 102 is classified into an FFT processing unit 1021 as a processing unit that performs signal processing of the UL of Layer 1, a resource demapping unit 1022, a signal detection unit 1023, a demodulation unit 1024, a decoding unit 1025, a MAC processing unit 1026 as a processing unit that performs signal processing of the UL of Layer 2, an RLC processing unit 1027, and a PDCP processing unit 1028. In addition, the inter-RAU signal reception unit 102 includes an input unit 1020. The FFT processing unit 1021 performs removal of CP and FFT processing with respect to an UL signal that is received. The resource demapping unit 1022 extracts a modulation symbol, which is scheduled to respective pieces of user equipment UE, from a modulation symbol that is subjected to the FFT processing. The signal detection unit 1023 separates a spatial multiplex modulation symbol for each layer. Furthermore, for example, the signal detection unit 1023 may perform signal detection by using MLD, and the like. The demodulation unit 1024 demodulates a bit stream from the modulation symbol that is detected. The decoding unit 1025 performs processing of decoding the bit stream that is demodulated. The MAC processing unit 1026 performs various types of processing in accordance with a MAC sub-layer. The RLC processing unit 1027 performs various types of processing in accordance with an RLC sub-layer. The PDCP processing unit 1028 performs various types of processing in accordance with a PDCP sub-layer. The input unit 1020 transmits the UL signal, which is received from the RAU 2, to any one of the FFT processing unit 1021, the resource demapping unit 1022, the signal detection unit 1023, the demodulation unit 1024, the decoding unit 1025, the MAC processing unit 1026, the RLC processing unit 1027, the PDCP processing unit 1028, and the higher layer processing unit 103 on the basis of the function sharing as a notification from the function sharing determination unit 104 or the RAU 2.

(RAU)

Figure 10:
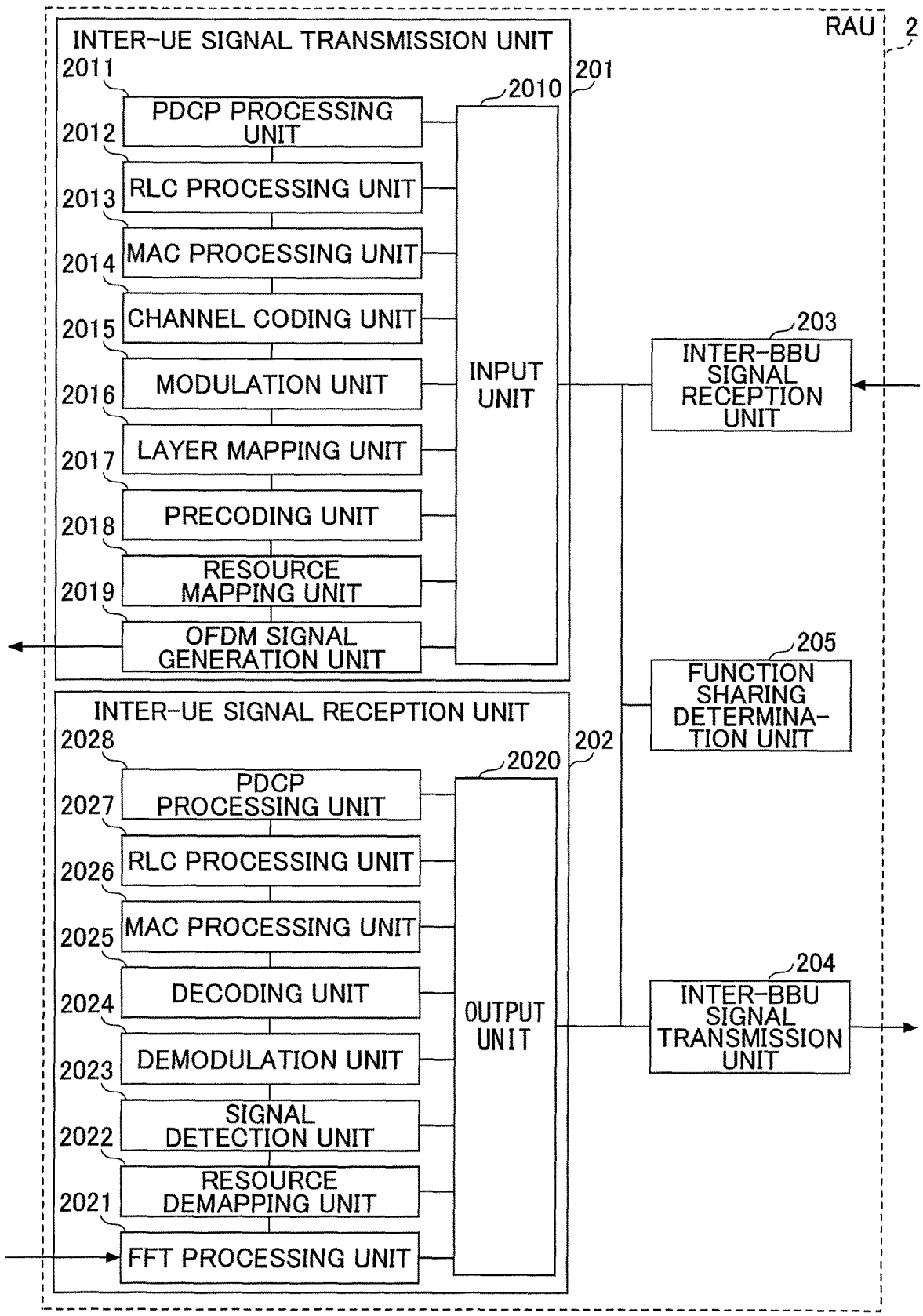
FIG. 10 is a diagram illustrating a functional configuration example of the RAU according to the embodiment.

FIG. 10 is a diagram illustrating a functional configuration example of the RAU in accordance with this embodiment. As illustrated in FIG. 10, the RAU 2 includes an inter-UE signal transmission unit 201, an inter-UE signal reception unit 202, an inter-BBU signal reception unit 203, an inter-BBU signal transmission unit 204, and a function sharing determination unit 205. Furthermore, FIG. 10 illustrates only function units, which particularly related to this embodiment, of the RAU 2, and the RAU 2 also has a function (not illustrated) of performing at least an operation in conformity to LTE (including 5G). In addition, the functional configuration illustrated in FIG. 10 is illustrative only. Function classification or the name of the function units may be arbitrary as long as the operation according to this embodiment can be executed.

The inter-UE signal transmission unit 201 includes a function of performing signal processing with respect to a DL signal received from the inter-BBU signal reception unit 203 on the basis of function sharing as a notification from the function sharing determination unit 205 or the BBU 1 to generate a signal, and of transmitting the signal that is generated to the user equipment UE. The inter-UE signal reception unit 202 includes a function of performing signal processing with respect to an UL signal received from the user equipment UE on the basis of the function sharing as a notification from the function sharing determination unit 205 or the BBU 1, and of transmitting the signal to the inter-BBU signal transmission unit 204.

The inter-BBU signal reception unit 203 and the inter-BBU signal transmission unit 204 include a function of transmitting and receiving a signal to and from the BBU 1, and a function as an interface of a predetermined protocol that is used in the FH.

The function sharing determination unit 205 includes a function of determining sharing between signal processing that is performed by the RAU 2 and signal processing that is performed by the BBU 1 on the basis of a predetermined reference value.

In addition, the inter-UE signal transmission unit 201 is classified into a PDCP processing unit 2011 as a processing unit that performs signal processing of the DL of Layer 2, an RLC processing unit 2012, a MAC processing unit 2013, a channel coding unit 2014 as a processing unit that performs signal processing of the DL of Layer 1, a modulation unit 2015, a layer mapping unit 2016, a precoding unit 2017, a resource mapping unit 2018, and OFDM signal generation unit 2019. In addition, the inter-UE signal transmission unit 201 includes an input unit 2010. The PDCP processing unit 2011, the RLC processing unit 2012, the MAC processing unit 2013, the channel coding unit 2014, the modulation unit 2015, the layer mapping unit 2016, the precoding unit 2017, the resource mapping unit 2018, and the OFDM signal generation unit 2019 are respectively the same as the PDCP processing unit 1011, the RLC processing unit 1012, the MAC processing unit 1013, the channel coding unit 1014, the modulation unit 1015, the layer mapping unit 1016, the precoding unit 1017, the resource mapping unit 1018, and the OFDM signal generation unit 1019 of the BBU 1, and thus description thereof will be omitted. The input unit 2010 transmits a DL signal received from the inter-BBU signal reception unit 203 to any one of the PDCP processing unit 2011, the RLC processing unit 2012, the MAC processing unit 2013, the channel coding unit 2014, the modulation unit 2015, the layer mapping unit 2016, the precoding unit 2017, the resource mapping unit 2018, and the OFDM signal generation unit 2019 on the basis of function sharing as a notification from the function sharing determination unit 205 or the BBU 1.

In addition, the inter-UE signal reception unit 202 is classified into an FFT processing unit 2021 as a processing unit that performs signal processing of the UL of Layer 1, a resource demapping unit 2022, a signal detection unit 2023, a demodulation unit 2024, a decoding unit 2025, a MAC processing unit 2026 as a processing unit that performs signal processing of the UL of Layer 2, an RLC processing unit 2027, and a PDCP processing unit 2028. In addition, the inter-UE signal reception unit 202 includes an output unit 2020. The FFT processing unit 2021, the resource demapping unit 2022, the signal detection unit 2023, the demodulation unit 2024, the decoding unit 2025, the MAC processing unit 2026, the RLC processing unit 2027, and the PDCP processing unit 2028 are respectively the same as the FFT processing unit 1021, the resource demapping unit 1022, the signal detection unit 1023, the demodulation unit 1024, the decoding unit 1025, the MAC processing unit 1026, the RLC processing unit 1027, and the PDCP processing unit 1028 of the BBU 1, and thus description thereof will be omitted. The output unit 2020 extracts a signal, which is generated by any one of the FFT processing unit 2021, the resource demapping unit 2022, the signal detection unit 2023, the demodulation unit 2024, the decoding unit 2025, the MAC processing unit 2026, the RLC processing unit 2027, and the PDCP processing unit 2028, on the basis of the function sharing as a notification from the function sharing determination unit 205 or the BBU 1, and transmits the signal to the inter-BBU signal transmission unit 204.

The entirety of the above-described functional configuration of the BBU 1 and the RAU 2 may be realized by a hardware circuit (for example, one or a plurality of IC chips). In addition, a part of the functional configuration may be configured as a hardware circuit, and the other portions may be realized by a CPU and a program.

(BBU)

Figure 11:
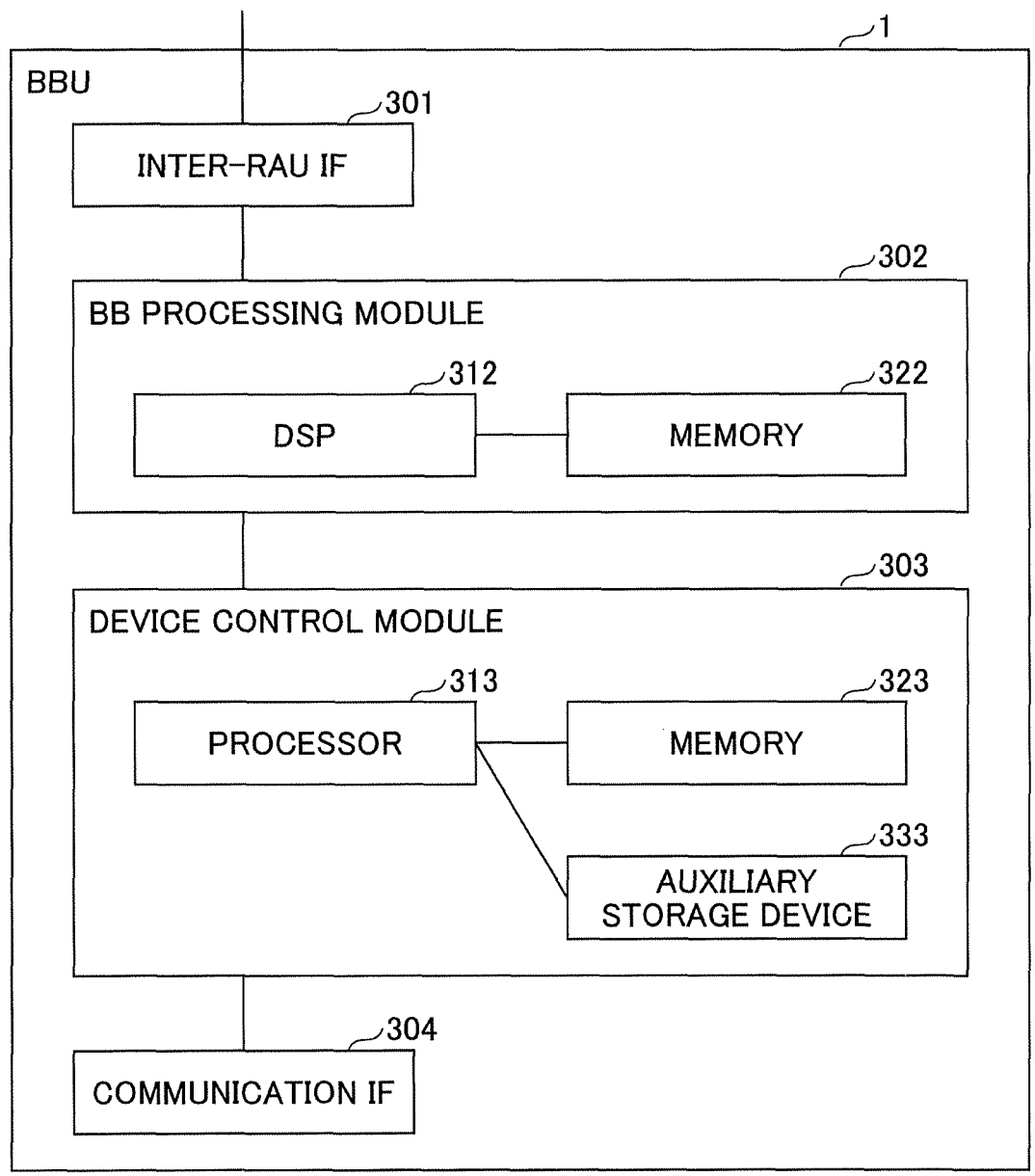
FIG. 11 is a diagram illustrating a hardware configuration example of the BBU according to the embodiment.

FIG. 11 is a diagram illustrating a hardware configuration example of the BBU according to this embodiment. FIG. 11 illustrates a configuration that is closer to a mounting example in comparison to FIG. 9. As illustrated in FIG. 11, the BBU 1 includes an inter-RAU IF 301 as an interface for connection to the RAU 2, a BB processing module 302 that performs dedicated line connection system signal processing, a device control module 303 that performs processing of a higher layer and the like, and a communication IF 304 as an interface for connection to a core network and the like.

The inter-RAU IF 301 has a function of connecting physical lines of the FH that connects the BBU 1 and the RAU 2 to each other, and a function of terminating a protocol that is used in the FH. For example, the inter-RAU IF 301 includes parts of the inter-RAU signal transmission unit 101 and the inter-RAU signal reception unit 102 which are illustrated in FIG. 9.

The BB processing module 302 performs processing of converting an IP packet and a signal that is transmitted and received to and from the RAU 2. A DSP 312 is a processor that performs signal processing in the BB processing module 302. A memory 322 is used as a work area of the DSP 312. For example, the BB processing module 302 includes parts of the inter-RAU signal transmission unit 101 and the inter-RAU signal reception unit 102 which are illustrated in FIG. 9, a part of the higher layer processing unit 103, and a part of the function sharing determination unit 104.

The device control module 303 performs protocol processing of an IP layer, operation and maintenance processing (OAM), and the like. A processor 313 is a processor that performs processing that is performed by the device control module 303. The memory 323 is used as a work area of the processor 313. Examples of an auxiliary storage device 333 include an HDD, and the like, and the auxiliary storage device 333 stores various types of setting information for an operation of the base station eNB, and the like. For example, the device control module 303 includes parts of the higher layer processing unit 103 and the function sharing determination unit 104 which are illustrated in FIG. 9.

(RAU)

Figure 12:
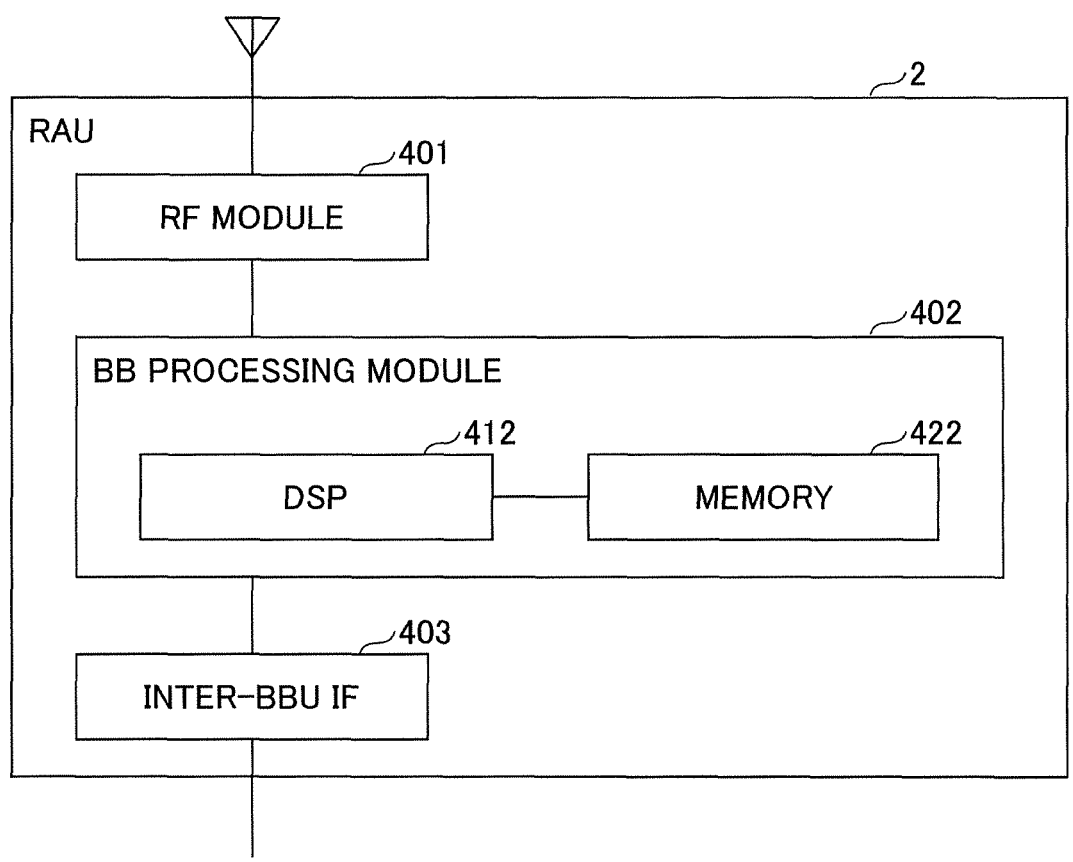
FIG. 12 is a diagram illustrating a hardware configuration example of the RAU according to the embodiment.

FIG. 12 is a diagram illustrating a hardware configuration example of the RAU according to this embodiment. FIG. 12 illustrates a configuration that is closer to a mounting example in comparison to FIG. 10. As illustrated in FIG. 12, the RAU 2 includes a radio frequency (RF) module 401 that performs processing related to a radio signal, a base band (BB) processing module 402 that performs dedicated line connection system signal processing, and an inter-BBU IF 403 as an interface for connection to the BBU 1.

The RF module 401 performs digital-to-analog (D/A) conversion, orthogonal modulation, frequency conversion, power amplification, and the like with respect to a digital baseband signal received from the BB processing module 402 to generate a radio signal to be transmitted from an antenna. In addition, the RF module 401 performs frequency conversion, analog-to-digital (A/D) conversion, orthogonal demodulation, and the like with respect to a radio signal that is received to generate a digital baseband signal, and transmits the signal to the BB processing module 402. The RF module 401 includes an RF function. For example, the RF module 401 includes parts of the inter-UE signal transmission unit 201 and the inter-UE signal reception unit 202 which are illustrated in FIG. 10.

The BB processing module 402 performs processing of converting a signal that is transmitted and received to and from the BBU 1 through the inter-BBU IF 403, and the digital baseband signal from each other. A digital signal processor (DSP) 412 is a processor that performs signal processing in the BB processing module 402. The memory 422 is used as a work area of the DSP 412. For example, the BB processing module 402 includes parts of the inter-UE signal transmission unit 201 and the inter-UE signal reception unit 202, and the function sharing determination unit 205 which are illustrated in FIG. 10.

The inter-BBU IF 403 has a function of connecting physical lines of the FH that connects the BBU 1 and the RAU 2 to each other, and a function of terminating a protocol that is used in the FH. For example, the inter-BBU IF 403 includes the inter-BBU signal reception unit 203 and the inter-BBU signal transmission unit 204 which are illustrated in FIG. 10.

CONCLUSION

As described above, according to the embodiment, there is provided a radio communication system provided with a first base station, a second base station that communicates with the first base station, and user equipment that communicates with the first base station, the radio communication system including a determiner that determines, based on a predetermined reference value, sharing between signal processing that is to be performed by the first base station and signal processing that is to be performed by the second base station; a first signal processor for the first base station to perform the signal processing in accordance with the sharing determined by the determiner; and a second signal processor for the second base station to perform the signal processing in accordance with the sharing determined by the determiner. By the radio communication system, there is provided a technology capable of appropriately switching function sharing between the BBU 1 and the RAU 2 in a radio communication network based on a C-RAN.

Further, the predetermined reference value may be a CRC success rate, an SINR, or an SNR of an uplink signal that is transmitted from the user equipment or a downlink signal that is received by the user equipment; a number of retransmission times of the uplink signal or the downlink signal; or a channel estimation error, and wherein the determiner may determine the sharing between the signal processing that is to be performed by the first base station and the signal processing that is to be performed by the second base station based on the CRC success rate, the SINR, or the SNR of the uplink signal that is transmitted from the user equipment or the downlink signal that is received by the user equipment; the number of retransmission times of the uplink signal or the downlink signal; or the channel estimation error. As a result, function sharing can be appropriately changed between the BBU 1 and the RAU 2 using the CRC success rate, the SINR, or the SNR of the uplink signal or the downlink signal, the number of retransmission times of the uplink signal or the downlink signal, or the channel estimation error.

Furthermore, the predetermined reference value may be a processing load on the first base station, or a processing load on the second base station, and wherein the determiner may determine the sharing between the signal processing that is to be performed by the first base station, and the signal processing that is to be performed by the second base station based on the processing load on the first base station or the processing load on the second base station. As a result, the function sharing can be appropriately switched between the BBU 1 and the RAU 2 based on the processing load on the RAU 2. In addition, the processing load on the RAU 2 can be reduced.

Further, the predetermined reference value may be a number of antennas included in the user equipment and a number of antennas included in the first base station, and wherein the determiner may determine the sharing between the signal processing that is to be performed by the first base station and the signal processing that is to be performed by the second base station based on whether the number of antennas included in the user equipment is greater than or equal to the number of antennas included in the first base station. As a result, the function sharing can be appropriately switched between the BBU 1 and the RAU 2 based on the number of antennas included in the user equipment UE and the number of antennas included in the RAU 2.

Further, the first signal processor may include a signal detector that performs signal detection of the uplink signal using an MMSE, and the second signal processor includes a signal detector that performs signal detection of the uplink signal using MLD, wherein the determiner may determine that the signal detection of the uplink signal is performed by the first signal processor, upon detecting that the CRC success rate, the SINR, or the SNR of the uplink signal that is transmitted from the user equipment or the downlink signal that is received by the user equipment is greater than or equal to a predetermined threshold value; upon detecting that the number of retransmission times of the uplink signal that is transmitted from the user equipment or the downlink signal that is received by the user equipment is less than a predetermined threshold value; or upon detecting that the channel estimation error of the uplink signal that is transmitted from the user equipment or the downlink signal that is received by the user equipment is less than a predetermined threshold value, and wherein the determiner may determine that the signal detection of the uplink signal is performed by the second signal processor, upon detecting that the CRC success rate, the SINR, or the SNR of the uplink signal that is transmitted from the user equipment or the downlink signal that is received by the user equipment is less than the predetermined threshold value; upon detecting that the number of retransmission times of the uplink signal that is transmitted from the user equipment or the downlink signal that is received by the user equipment is greater than or equal to the predetermined threshold value; or upon detecting that the channel estimation error of the uplink signal that is transmitted from the user equipment or the downlink signal that is received by the user equipment is greater than or equal to the predetermined threshold value. As a result, reception performance of the UL signal can be ensured while reducing the transmission amount through the FH. In addition, since the transmission amount through the FH is reduced, transmission latency can be prevented from occurring.

Further, according to the embodiment, there is provided a base station that is used as a first base station of a radio communication system provided with the first base station, a second base station that communicates with the first base station, and user equipment that communicates with the first base station, the base station including a determiner that determines, based on a predetermined reference value, sharing between signal processing that is to be performed by the base station and signal processing that is to be performed by the second base station; and a signal processor for the base station to perform the signal processing in accordance with the sharing determined by the determiner. According to the base station, there is provided a technology capable of appropriately switching the function sharing between the BBU 1 and the RAU 2 in the radio communication network based on the C-RAN.

Furthermore, according to the embodiment, there is provided a base station that is used as a second base station of a radio communication system provided with a first base station, the second base station that communicates with the first base station, and user equipment that communicates with the first base station, the base station including a determiner that determines, based on a predetermined reference value, sharing between signal processing that is to be performed by the first base station and signal processing that is to be performed by the base station; and a signal processor for the base station to perform the signal processing in accordance with the sharing determined by the determiner. There is provided a technology capable of appropriately switching the function sharing between the BBU 1 and the RAU 2 in the radio communication network based on the C-RAN.

Supplements of Embodiments

As described above, the configurations of the respective devices (the BBU 1 and the RAU 2) described in the embodiment of the invention may be a configuration that is implemented when a program is executed by a processor (CPU) in the device including the CPU and a memory, or a configuration that is implemented by hardware such as a hardware circuit including a logic of the processing described in this embodiment. In addition, the program or the hardware may coexist.

The embodiments of the present invention are described above, but the disclosed invention is not limited to the embodiments, and those skilled in the art would appreciate various modified examples, revised examples, alternative examples, substitution examples, and so forth. In order to facilitate understanding of the invention, specific numerical value examples are used for description, but the numerical values are merely examples, and certain suitable values may be used unless as otherwise stated. The classification of items in the above description is not essential to the present invention. Matters described in two or more items may be combined and used as necessary, and a matter described in one item may be applied to a matter described in another item (provided that they do not contradict). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the sequences and flowcharts described in the embodiments, the order may be changed as long as there is no inconsistency. For the sake of convenience of processing description, the BBU1 and the RAU1 are described using the functional block diagrams, but such devices may be implemented by hardware, software, or a combination thereof. Software executed by the processor included in the BBU1 1 according to the embodiment of the present invention and software executed by the processor included in the RAU2 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Notification of information is not limited the aspect/embodiment described in the present specification any may be performed by other methods. For example, notification of information may be performed via physical layer signaling (for example, Downlink Control Information (DCI) or Uplink Control Information (UCI)), upper-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Furthermore, each aspect/embodiment described in this specification can be applied to long term evolution (LTE), LIE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

The UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The terms "determining" and "deciding" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

In addition, processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Notification of predetermined information (e.g., notification of "being X") is not limited to notification that is made explicitly, and the notification may be made implicitly (e.g., notification of the predetermined information is not performed).

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

The first base station in this embodiment is an example of the RAU 2. The second base station is an example of the BBU 1. The function sharing determination unit 104 or the function sharing determination unit 205 is an example of the determination unit. The inter-UE signal transmission unit 201 or the inter-UE signal reception unit 202 is an example of the first signal processing unit. The inter-RAU signal transmission unit 101 or the inter-RAU signal reception unit 102 is an example of the second signal processing unit.

This international patent application is based upon and claims the benefit of priority of Japanese Patent Application No. 2016-048749 filed on Mar. 11, 2016, and the entire contents of Japanese Patent Application No. 2016-048749 are incorporated herein by reference.

LIST OF REFERENCE SYMBOLS

1 BBU
2 RAU
eNB Base station
101 Inter-RAU signal transmission unit
102 Inter-RAU signal reception unit
103 Higher layer processing unit
104 Function sharing determination unit
201 Inter-UE signal transmission unit 202 Inter-UE signal reception unit
203 Inter-BBU signal reception unit
204 Inter-BBU signal transmission unit
205 Function sharing determination unit
301 Inter-RAU IF
302 BB processing module
303 Device control module
304 Communication IF
401 RF module
402 BB processing module
403 Inter-BBU IF

The invention claimed is:

1. A radio communication system comprising:
a first base station, being a remote antenna unit, a second base station, being a baseband unit that communicates with the first base station, and a user equipment;
a determiner that determines, based on a predetermined reference value, a boundary of function sharing between signal processing that is to be performed by the first base station and signal processing that is to be performed by the second base station;
a first signal processor for the first base station to perform the signal processing in accordance with the boundary of the function sharing determined by the determiner; and
a second signal processor for the second base station to perform the signal processing in accordance with the boundary of the function sharing determined by the determiner,
wherein the predetermined reference value is a Cyclic Redundancy Check (CRC) success rate, a signal to interference plus noise power ratio (SINR), or a signal to noise ratio (SNR) of an uplink signal that is transmitted from the user equipment or a downlink signal that is received by the user equipment; a number of retransmission times of the uplink signal or the downlink signal; or a channel estimation error,
wherein the determiner determines the boundary of the function sharing between the signal processing that is to be performed by the first base station and the signal processing that is to be performed by the second base station based on the CRC success rate, the SINR, or the SNR of the uplink signal that is transmitted from the user equipment or the downlink signal that is received by the use equipment; the number of retransmission times of the uplink signal or the downlink signal; or the channel estimation error,
wherein the first signal processor includes a signal detector that performs signal detection of the uplink signal that is transmitted from the user equipment using a minimum mean squared error (MMSE), and the second signal processor includes a signal detector that performs signal detection of the uplink signal using a maximum likelihood detection (MLD),
wherein the determiner determines that the signal detection of the uplink signal is performed by the first signal processor, upon detecting that the CRC success rate, the SINR, or the SNR of the uplink signal that is transmitted from the user equipment or the downlink signal that is received by the user equipment is greater than or equal to a first predetermined threshold value; upon detecting that the number of retransmission times of the uplink signal that is transmitted from the user equipment or the downlink signal that is received by the user equipment is less than a second predetermined threshold value; or upon detecting that the channel estimation error of the uplink signal that is transmitted from the user equipment or the downlink signal that is received by the user equipment is less than a third predetermined threshold value, and
wherein the determiner determines that the signal detection of the uplink signal is performed by the second signal processor, upon detecting that the CRC success rate, the SINR, or the SNR of the uplink signal that is transmitted from the user equipment or the downlink signal that is received by the user equipment is less than the first predetermined threshold value; upon detecting that the number of retransmission times of the uplink signal that is transmitted from the user equipment or the downlink signal that is received by the user equipment is greater than or equal to the second predetermined threshold value; or upon detecting that the channel estimation error of the uplink signal that is transmitted from the user equipment or the downlink signal that is received by the user equipment is greater than or equal to the third predetermined threshold value.

2. A base station that is used as a first base station being a remote antenna unit of a radio communication system provided with a second base station, the first base station that communicates with the second base station, and a user equipment, the base station comprising:
a determiner that determines, based on a predetermined reference value, a boundary of function sharing between signal processing that is to be performed by the first base station and signal processing that is to be performed by the second base station; and
a signal processor of the first base station that performs the signal processing in accordance with the boundary of the function sharing determined by the determiner,
wherein the predetermined reference value is a Cyclic Redundancy Check (CRC) success rate, a signal to interference plus noise power ratio (SINR), or a signal to noise ratio (SNR) of an uplink signal that is transmitted from the user equipment or a downlink signal that is received by the user equipment; a number of retransmission times of the uplink signal or the downlink signal; or a channel estimation error,
wherein the determiner determines the boundary of the function sharing between the signal processing that is to be performed by the first base station and the signal processing that is to be performed by the second base station based on the CRC success rate, the SINR, or the SNR of the uplink signal that is transmitted from the user equipment or the downlink signal that is received by the user equipment; the number of retransmission times of the uplink signal or the downlink signal; or the channel estimation error,
wherein the signal processor includes a signal detector that performs signal detection of the uplink signal using a minimum mean squared error (MMSE), and
wherein the determiner determines that the signal detection of the uplink signal is performed by the signal processor, upon detecting that the CRC success rate, the SINR, or the SNR of the uplink signal that is transmitted from the user equipment or the downlink signal that is received by the user equipment is greater than or equal to a first predetermined threshold value; upon detecting that the number of retransmission times of the uplink signal that is transmitted from the user equipment or the downlink signal that is received by the user equipment is less than a second predetermined threshold value; or upon detecting that the channel estimation error of the uplink signal that is transmitted from the user equipment or the downlink signal that is received by the user equipment is less than a third predetermined threshold value.

3. A base station that is used as a second base station being a baseband unit of a radio communication system provided with a first base station, the second base station that communicates with the first base station, and a user equipment, the base station comprising:
- a determiner that determines, based on a predetermined reference value, a boundary of function sharing between signal processing that is to be performed by the first base station and signal processing that is to be performed by the second base station; and
- a signal processor of the second base station that performs the signal processing in accordance with the boundary of the function sharing determined by the determiner,
- wherein the predetermined reference value is a Cyclic Redundancy Check (CRC) success rate, a signal to interference plus noise power ratio (SINR), or a signal to noise ratio (SNR) of an uplink signal that is transmitted from the user equipment or a downlink signal that is received by the user equipment; a number of retransmission times of the uplink signal or the downlink signal; or a channel estimation error,
- wherein the determiner determines the boundary of the function sharing between the signal processing that is to be performed by the first base station and the signal processing that is to be performed by the second base station based on the CRC success rate, the SINR, or the SNR of the uplink signal that is transmitted from the user equipment or the downlink signal that is received by the user equipment; the number of retransmission times of the uplink signal or the downlink signal; or the channel estimation error,
- wherein the signal processor includes a signal detector that performs signal detection of the uplink signal using a maximum likelihood detection (MLD), and
- wherein the determiner determines that the signal detection of the uplink signal is performed by the signal processor, upon detecting that the CRC success rate, the SINR, or the SNR of the uplink signal that is transmitted from the user equipment or the downlink signal that is received by the user equipment is less than a first predetermined threshold value; upon detecting that the number of retransmission times of the uplink signal that is transmitted from the user equipment or the downlink signal that is received by the user equipment is greater than or equal to a second predetermined threshold value; or upon detecting that the channel estimation error of the uplink signal that is transmitted from the user equipment or the downlink signal that is received by the user equipment is greater than or equal to a third predetermined threshold value.

* * * * *